US012444868B2

(12) United States Patent
Sato et al.

(10) Patent No.: US 12,444,868 B2
(45) Date of Patent: Oct. 14, 2025

(54) CONNECTOR WITH SUBSTRATE

(71) Applicant: JAPAN AVIATION ELECTRONICS INDUSTRY, LIMITED, Tokyo (JP)

(72) Inventors: Yukiko Sato, Tokyo (JP); Yukitaka Tanaka, Tokyo (JP); Gota Kameyama, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 316 days.

(21) Appl. No.: 18/140,150

(22) Filed: Apr. 27, 2023

(65) Prior Publication Data

US 2024/0079807 A1 Mar. 7, 2024

(30) Foreign Application Priority Data

Jul. 25, 2022 (JP) ................................ 2022-118180

(51) Int. Cl.
*H01R 12/71* (2011.01)
*H01R 12/73* (2011.01)

(52) U.S. Cl.
CPC .......... *H01R 12/716* (2013.01); *H01R 12/73* (2013.01)

(58) Field of Classification Search
CPC ....... H01R 12/73; H01R 12/71; H01R 12/716
USPC ............ 439/67.47, 0.56, 0.35, 0.13, 0.09, 7
See application file for complete search history.

(56) References Cited

U.S. PATENT DOCUMENTS 4,842,554 A * 6/1989 Cosmos ............ H01R 13/6582 439/607.17
4,908,335 A * 3/1990 Cosmos .............. H01R 12/716 439/444
5,186,633 A * 2/1993 Mosser, III .......... H01R 12/724 439/83
6,273,757 B1 * 8/2001 David ................ H01R 13/6594 439/607.13
(Continued)

FOREIGN PATENT DOCUMENTS

CN 113161800 A 7/2021
EP 2393161 A1 12/2011
(Continued)

OTHER PUBLICATIONS

Taiwan Intellectual Property Office, "Office Action with Search Report for Taiwanese Patent Application 112118552," Dec. 5, 2023.

*Primary Examiner* — Harshad C Patel
(74) *Attorney, Agent, or Firm* — Kreative IP Management LLC; Fuiyeong Kim

(57) ABSTRACT

A compression connector is fixed to a substrate with a small motion. In a connector with substrate, a compression connector pressed against and connected to a connection target object and a substrate are attached. The connector with substrate includes a substrate including a hole; and a compression connector disposed on the substrate and including contacts that are in contact with the substrate, a housing to which the contacts are fixed, and a cover shell that has a top surface disposed in parallel to the substrate and a vertical surface vertically extending to the substrate from the top surface, and that covers an upper surface portion of the housing. The vertical surface includes at least one fixing part at a substrate side, piercing through the hole formed in the substrate, and functioning as slip-off prevention for the compression corrector with respect to the substrate.

3 Claims, 26 Drawing Sheets

(56) References Cited

U.S. PATENT DOCUMENTS 7,824,220 B2 * 11/2010 Chen .................. H01R 13/6477 439/660
7,922,535 B1 * 4/2011 Jiang .................. H01R 13/5205 439/271
7,934,957 B1 * 5/2011 Nakajima ............ H01R 12/724 439/495
8,206,177 B2 * 6/2012 Chang .................. H01R 13/502 439/607.35
8,262,414 B1 * 9/2012 Li ...................... H01R 13/6273 439/607.37
8,292,669 B2 * 10/2012 Wang ................... H01R 12/721 439/607.2
8,597,051 B2 * 12/2013 Yang .................... H01R 12/707 439/589
8,690,605 B2 * 4/2014 Wang ................... H01R 13/504 439/607.37
8,727,803 B2 * 5/2014 Kurachi ............... H01R 13/639 439/497
8,814,594 B2 * 8/2014 Miyazaki ............... H01R 12/55 439/260
8,936,476 B2 * 1/2015 Shindo ................... H01R 12/00 439/153
9,509,084 B2 * 11/2016 Zhao .................... H01R 43/005
9,893,448 B2 * 2/2018 Mashima ............. H01R 12/774
10,804,652 B2 * 10/2020 Muro ................. H01R 13/6273
2003/0211781 A1 * 11/2003 Ono ..................... H01R 13/658 439/607.47
2009/0035963 A1 2/2009 Kawamura
2010/0068903 A1 * 3/2010 Chiang ................ H01R 12/725 439/79
2012/0108105 A1 * 5/2012 Cheng .................. H01R 12/585 439/607.35
2013/0252466 A1 * 9/2013 Chen .................. H01R 13/6658 439/682
2013/0288526 A1 * 10/2013 Rascon ............. H01R 13/6586 439/607.35
2014/0370751 A1 * 12/2014 Zheng .................. H01R 12/724 439/607.55
2018/0115098 A1 * 4/2018 Little ................... H01R 12/716
2021/0226361 A1 * 7/2021 Mason ............... H01R 13/6471

FOREIGN PATENT DOCUMENTS

JP 2000-012123 A 1/2000
JP 2000-235879 A 8/2000
TW 200924310 A 6/2009

* cited by examiner

Prior Art

CONNECTOR WITH SUBSTRATE

CROSS-REFERENCE TO RELATED APPLICATION

The present application is based on and claims priority from Japanese Patent Application No. 2022-118180 filed on Jul. 25, 2022, the disclosure of which is hereby incorporated by reference herein in its entirety.

BACKGROUND OF THE INVENTION

Field of the Invention

The present invention relates to a connector with substrate.

Description of the Related Art

A connector of a compression type pressed against and connected to a connection target object such as a substrate has been publicly known. The structure of the connector of this type is disclosed in, for example, Japanese Patent Application Laid-Open No. 2000-12123 (Patent Literature 1). The connector of the compression type of the related art disclosed in Patent Literature 1 described below is configured as an electric connector (1) including a contact (20) including an elastic spring section (23) as shown in FIG. 26. In the electric connector (1), a plurality of contacts (20) are disposed in an arrayed state.

The contact (20) includes a substrate connecting section (22) solder-connected to a first circuit board (30) and a contact section (24) that is in contact with a second circuit board (40). The elastic spring section (23) having a spring property is provided between the substrate connecting section (22) and the contact section (24). The second circuit board (40) is pressed from the upward side of the contact (20) attached on the first circuit board (30) by solder-connection, whereby the elastic spring section (23) of the contact (20) exerts the spring property to generate a contact pressure between the second circuit board (40) and the contact (20). Note that reference numerals and signs concerning explanation of the related art document are distinguished from those in embodiments of the present invention by being parenthesized.

In the compression connector of the related art, screwing has been used for attachment (fixing) to the substrate.

However, when the compression connector is fixed to the substrate by the screwing, in general, a method of attaching nuts from a substrate surface on the opposite side of a connector mounting surface side on which the connector is mounted and tightening screws from the connector mounting surface side is adopted. In such a case of the related art, an operator needs to press the connector and the nuts with a hand or the like while tightening the screws. Thus, there is a problem that it is hard to do connector attaching (fixing) work. That is, since the nuts, which are separate components, are necessary besides the screws in a fixing structure for the compression connector and the substrate by the screwing of the related art, problems exist such as that the nuts are likely to be lost or work manhours increase.

That is, in the compression connector of the related art, it has been demanded to realize a configuration for performing secure attachment while improving workability of attachment in the attachment (fixing) to the substrate.

Accordingly, an object of the present invention is to realize a configuration with which, when a compression connector and a substrate are fixed, connector attaching (fixing) work is simple and the compression connector can be fixed to the substrate with a small motion.

SUMMARY OF THE INVENTION

A connector with substrate according to the present invention is a connector with substrate in which a connector of a compression type pressed against and connected to a connection target object and a substrate are attached, the connector with substrate including a compression connector including contacts that are in contact with the substrate, a housing to which the contacts are fixed, and a cover shell that covers an upper surface portion of the housing, wherein the cover shell includes a vertical surface vertically bent in a direction of the substrate from a top surface of the cover shell disposed in parallel to the substrate, and at least one or more fixing parts piercing through a hole formed in the substrate and functioning as slip-off prevention for the compression corrector with respect to the substrate are formed on the substrate side of the vertical surface.

That is, the connector with substrate according to the present invention includes a mechanism for attaching the connector of the compression type and the substrate. A simple and secure fixed state can be obtained by inserting the fixing part into the hole formed in the substrate.

In the connector with substrate according to the present invention, the fixing part can be formed to include: a flat base section formed to be connected to the substrate side of the vertical surface; an opening section connected to the substrate side of the base section and including an opening hole; and a flat distal end portion formed to be connected to the substrate side of the opening section.

Further, in the connector with substrate according to the present invention, the opening section can be formed to have a width dimension larger than the base section and the distal end portion to form the fixing part as a press-fit pin.

That is, when the fixing part is formed as the press-fit pin, the fixing part is compressed in the hole of the substrate, and the compression connector is held not to slip off in the vertical direction with respect to the substrate by a frictional force of the substrate and the hole.

Further, the connector with substrate according to the present invention can include a slip-stop pin inserted into the opening hole included in the opening section, and the slip-stop pin can include: a distal end portion bent when being inserted into the opening hole; an insertion section functioning as slip-off prevention for the compression connector with respect to the substrate by being inserted into the opening hole; and a flange section having a width dimension larger than a hole diameter of the opening hole.

That is, since the slip-stop pin is prevented from slipping off, after being inserted into the opening hole included in the opening section of the fixing part, by the distal end thereof being bent, the slip-stop pin is not dropped or lost unlike the screws and the nuts of the related art. Since the connector with substrate contains a mechanism for fixing the compression connector with a pin shape of the slip-stop pin, unlike with the related art, work manhours involving attachment are reduced and torque management for the screws is unnecessary.

Further, in the connector with substrate according to the present invention, the compression connector can include a bottom shell that covers a lower surface portion of the housing.

According to the present invention, it is possible to realize a structure in which, when the compression connector and the substrate are fixed, connector attaching (fixing) work is easy and the compression connector can be fixed to the substrate with a small motion. Therefore, according to the present invention, it is possible to perform secure attachment while improving workability of attachment (fixing) of the compression connector to the substrate.

DETAILED DESCRIPTION OF THE PREFERRED EMBODIMENTS

Preferred embodiments for carrying out the present invention are explained below with reference to the drawings. Note that, in the figures, a first direction, a second direction, and a third direction are defined for convenience of explanation. In this specification, the first direction is the front-rear direction. In the figures, the front-rear direction is shown as an X direction. In particular, a forward direction is represented as a +X direction and a rearward direction is represented as a −X direction. In this specification, the second direction is the left-right direction. In the figures, the left-right direction is shown as a Y direction. In particular, the right direction is represented as a +Y direction and the left direction is represented as a −Y direction. Further, in this specification, the third direction is the up-down direction. In the figures, the up-down direction is shown as a Z direction. In particular, an upward direction is represented as +Z direction and a downward direction is represented as −Z direction. However, the X direction, which is the first direction, the Y direction, which is the second direction, and the Z direction, which is the third direction, defined in this specification do not limit directions at the time of use of connectors with substrate in the embodiments. The connectors with substrate in the embodiments can be used in all directions.

The embodiments described below do not limit the inventions according to the claims. Not all of combinations of characteristics explained in the embodiments are essential for the solution of the invention.

First Embodiment

Figure 1:
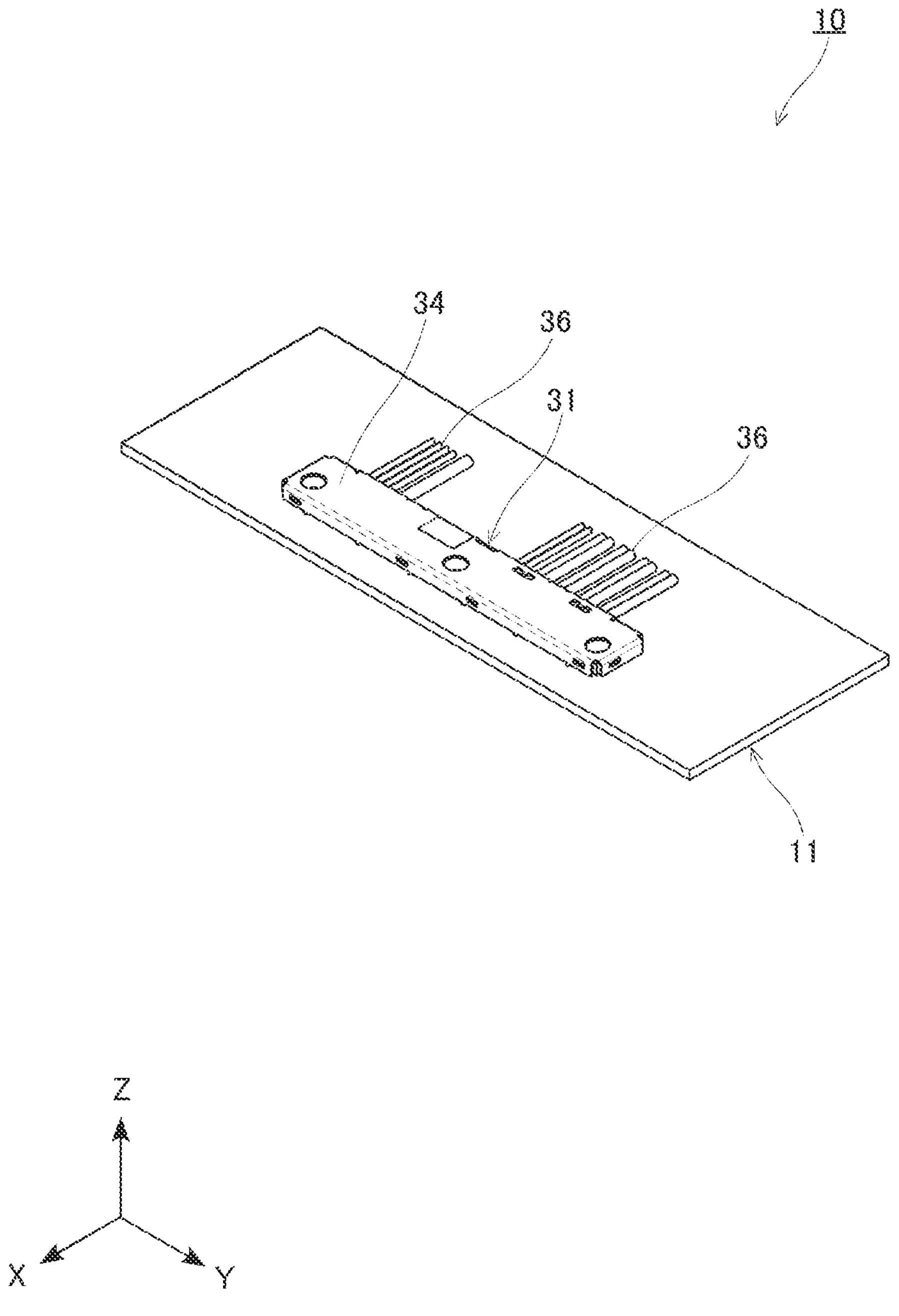
FIG. 1 is an exterior perspective view of a connector with substrate according to a first embodiment viewed from the front upper right.
Figure 2:
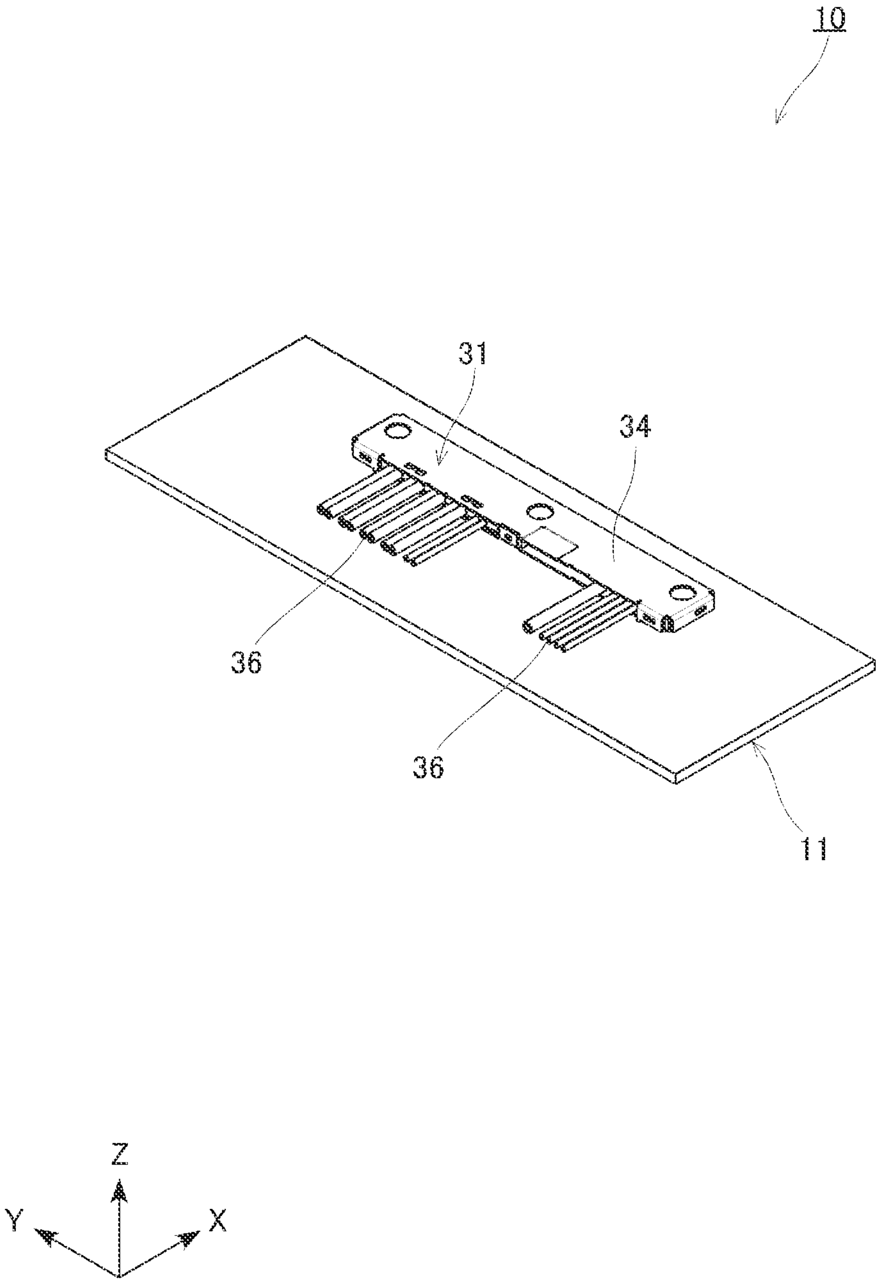
FIG. 2 is an exterior perspective view of the connector with substrate according to the first embodiment viewed from the rear upper left.

A configuration of a connector with substrate 10 according to a first embodiment is explained with reference to FIGS. 1 to 13. The connector with substrate 10 according to the first embodiment includes, as shown in FIGS. 1 to 3, a substrate 11 and a compression connector 31 attached to the upper surface of the substrate 11.

The substrate 11 includes a not-shown printed circuit and the like. The substrate 11 is electrically connected to the compression connector 31 attached to the upper surface of the substrate 11 to be configured to be able to deliver an electric signal, power supply power, and the like.

Figure 3:
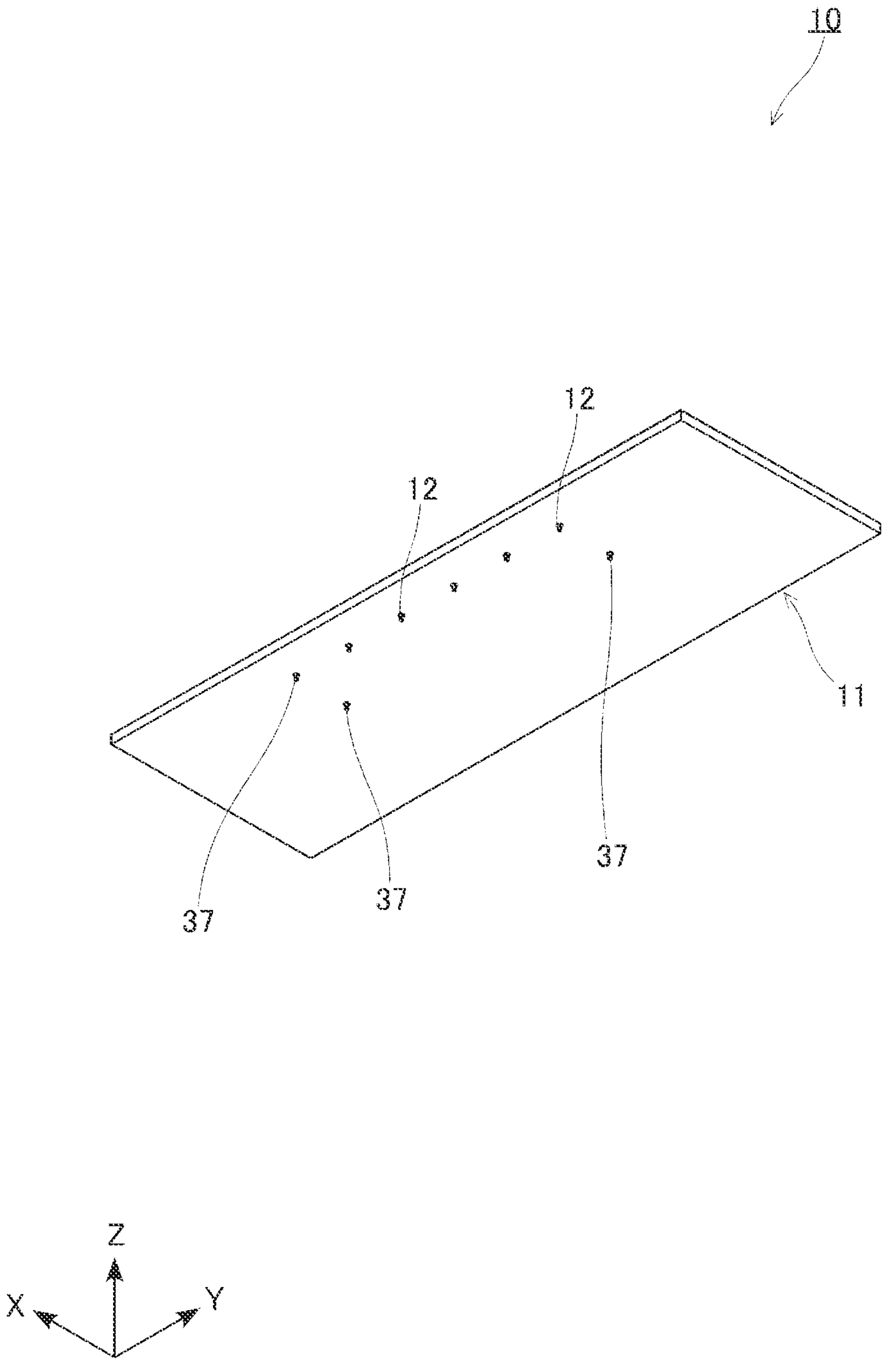
FIG. 3 is an exterior perspective view of the connector with substrate according to the first embodiment viewed from the front lower right.
Figure 4:
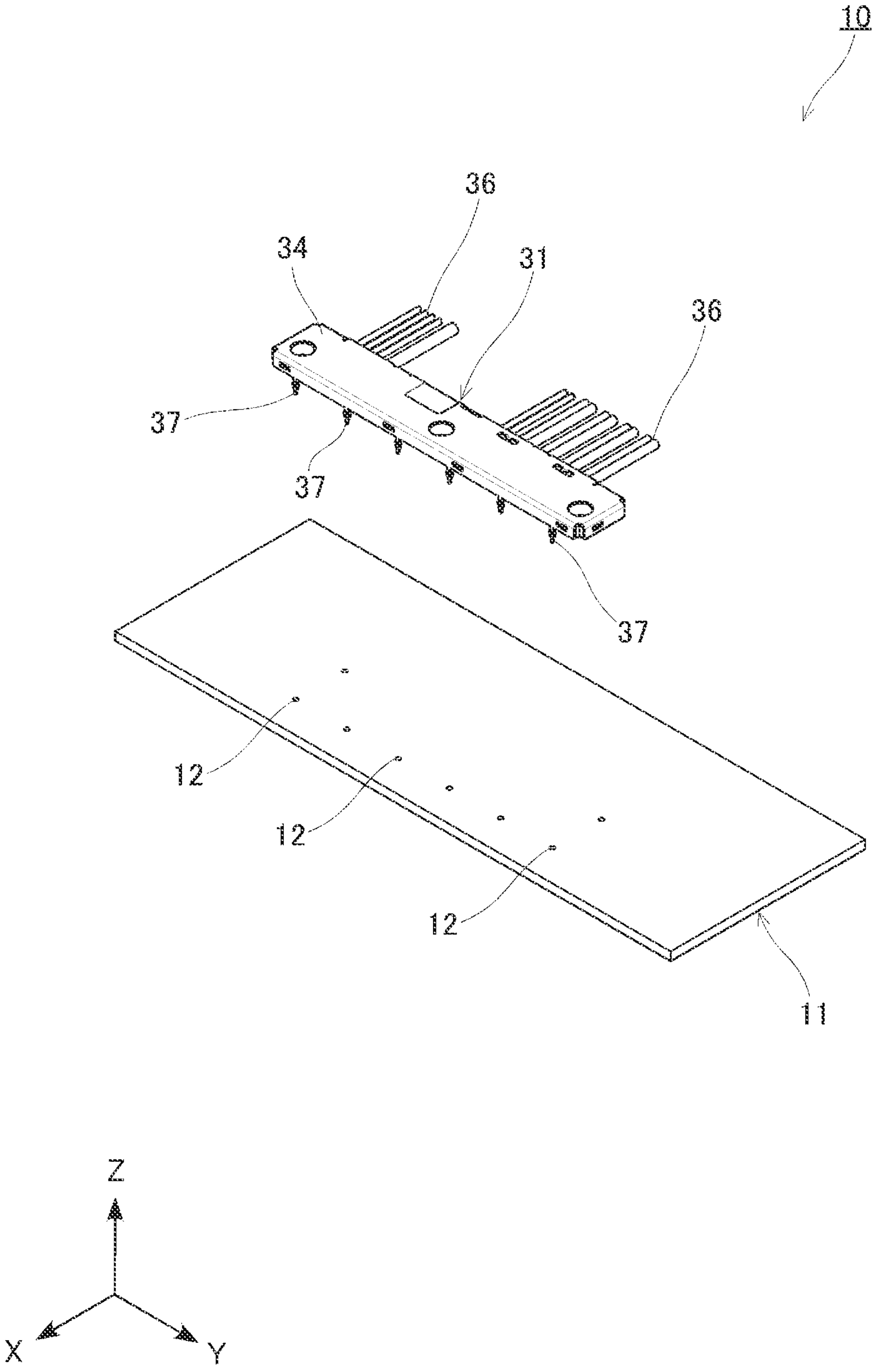
FIG. 4 is an exterior perspective view of a state in which a compression connector is detached from a substrate in the connector with substrate according to the first embodiment, the state being viewed from the front upper right.
Figure 5:
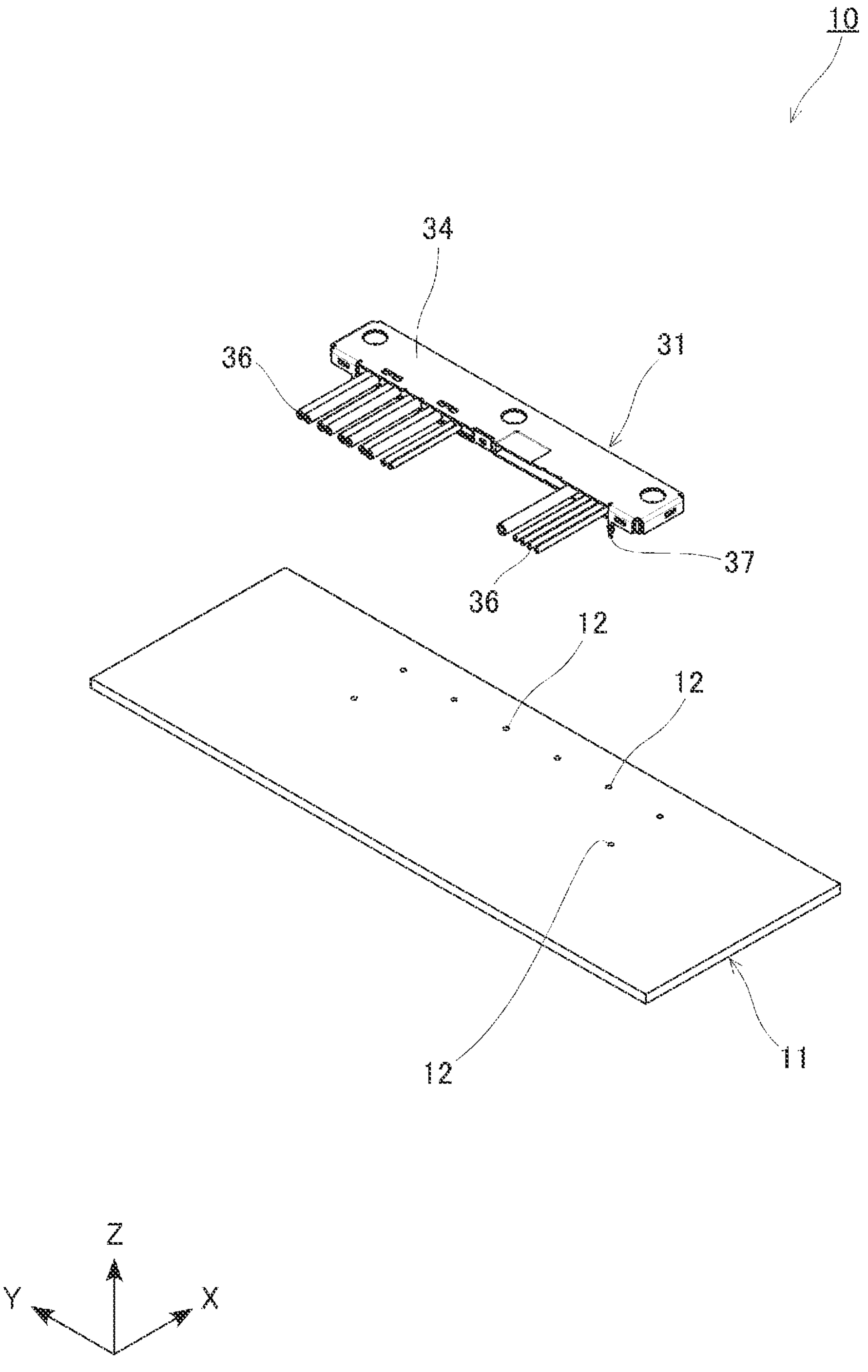
FIG. 5 is an exterior perspective view of the state in which the compression connector is detached from the substrate in the connector with substrate according to the first embodiment, the state being viewed from the rear upper left.
Figure 6:
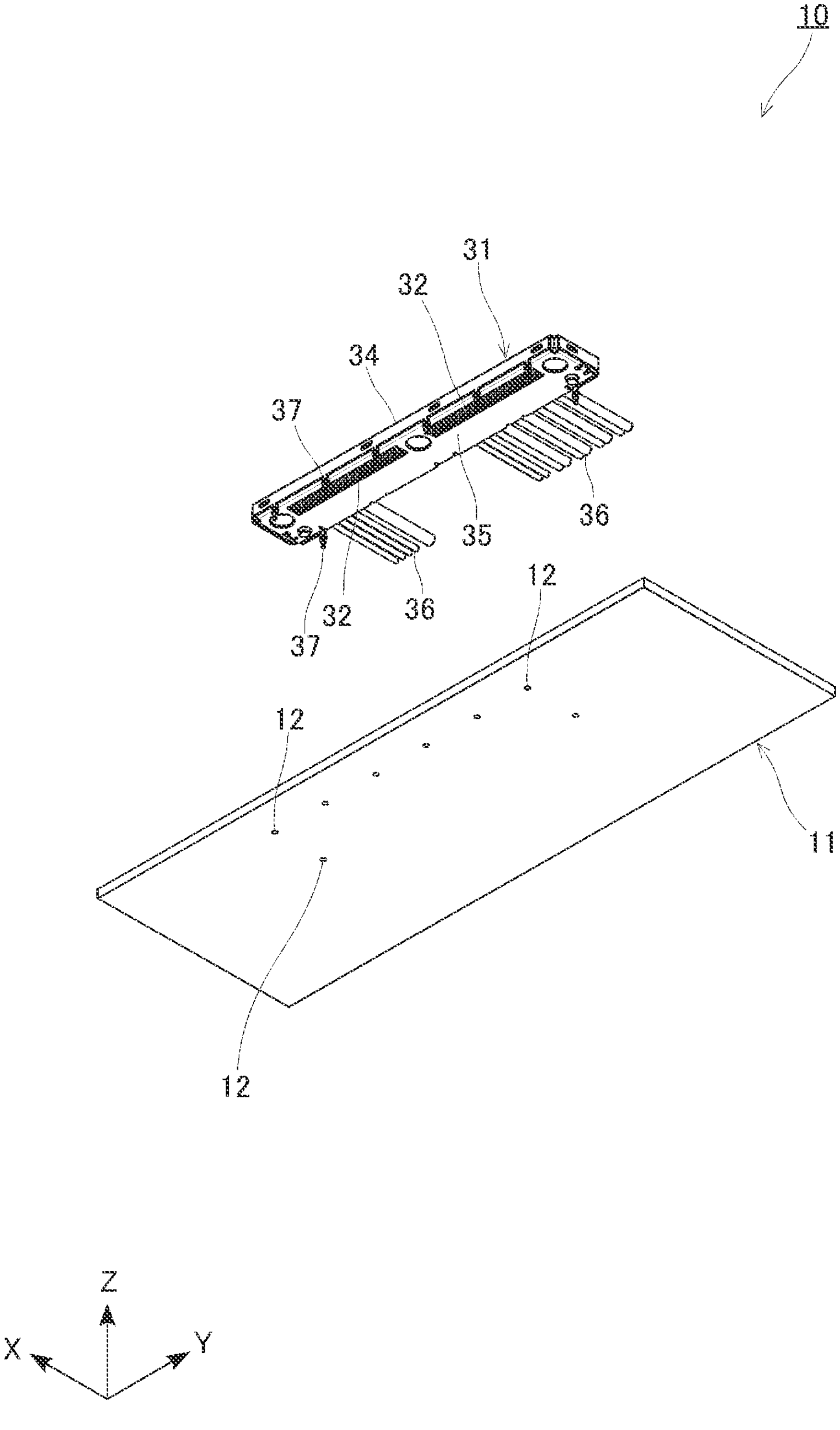
FIG. 6 is an exterior perspective view of the state in which the compression connector is detached from the substrate in the connector with substrate according to the first embodiment, the state being viewed from the front lower right.
Figure 7:
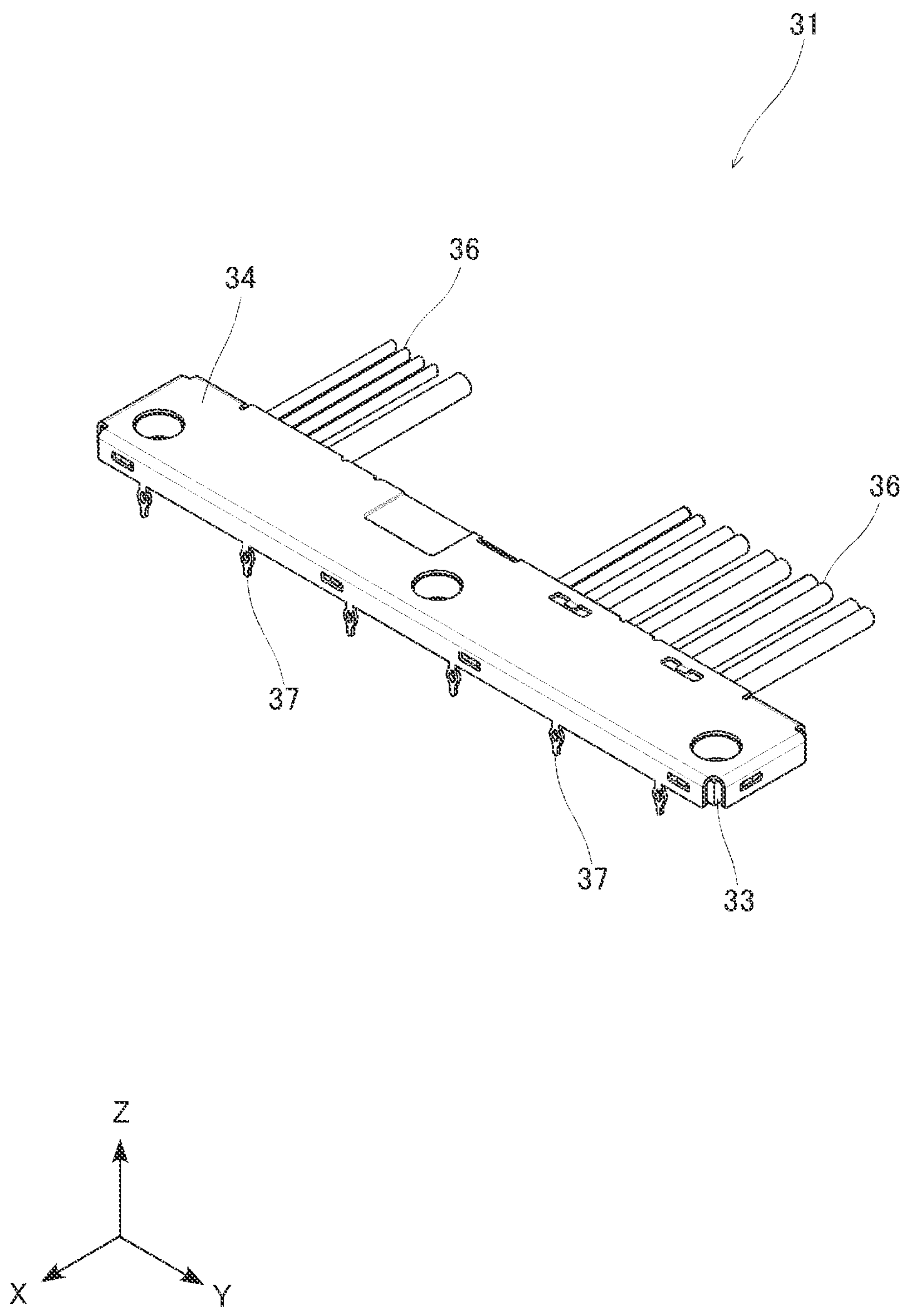
FIG. 7 is an exterior perspective view of the compression connector according to the first embodiment viewed from the front upper right.

A plurality of holes 12 are formed in the substrate 11 as illustrated in, in particular, FIG. 3. A plurality of press-fit pins 37 included in the compression connector 31 explained below are inserted into the plurality of (in the first embodiment, eight) holes 12 to fix the compression connector 31 to the substrate 11. Note that the plurality of press-fit pins 37 are parts formed as the fixing parts according to the present invention.

The compression connector 31 includes, as shown in FIGS. 7 to 11, contacts 32 that are in contact with the substrate 11, a housing 33 to which the contacts 32 are fixed, a cover shell 34 that covers the upper surface portion of the housing 33, and a bottom shell 35 that covers the lower surface portion of the housing 33.

Figure 8:
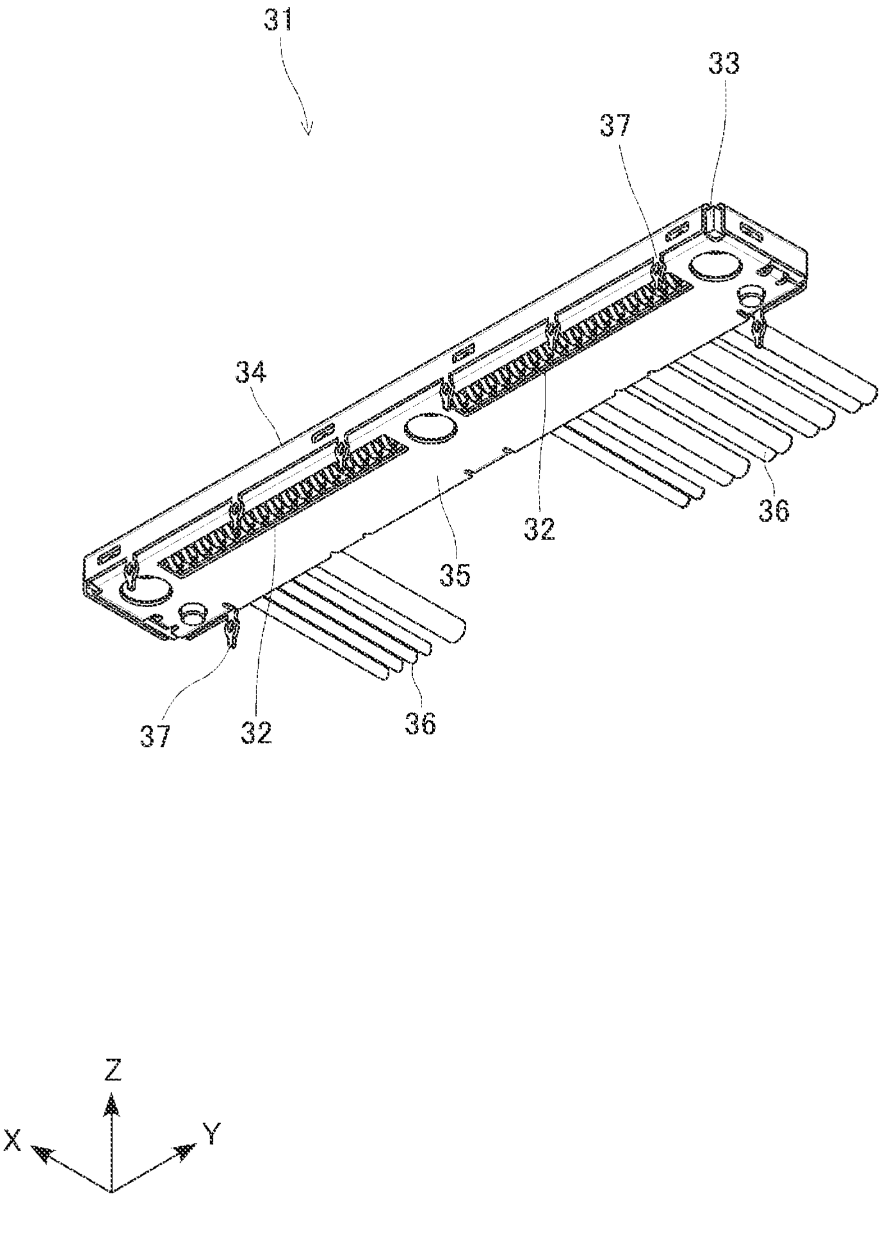
FIG. 8 is an exterior perspective view of the compression connector according to the first embodiment viewed from the front lower right.
Figure 9:
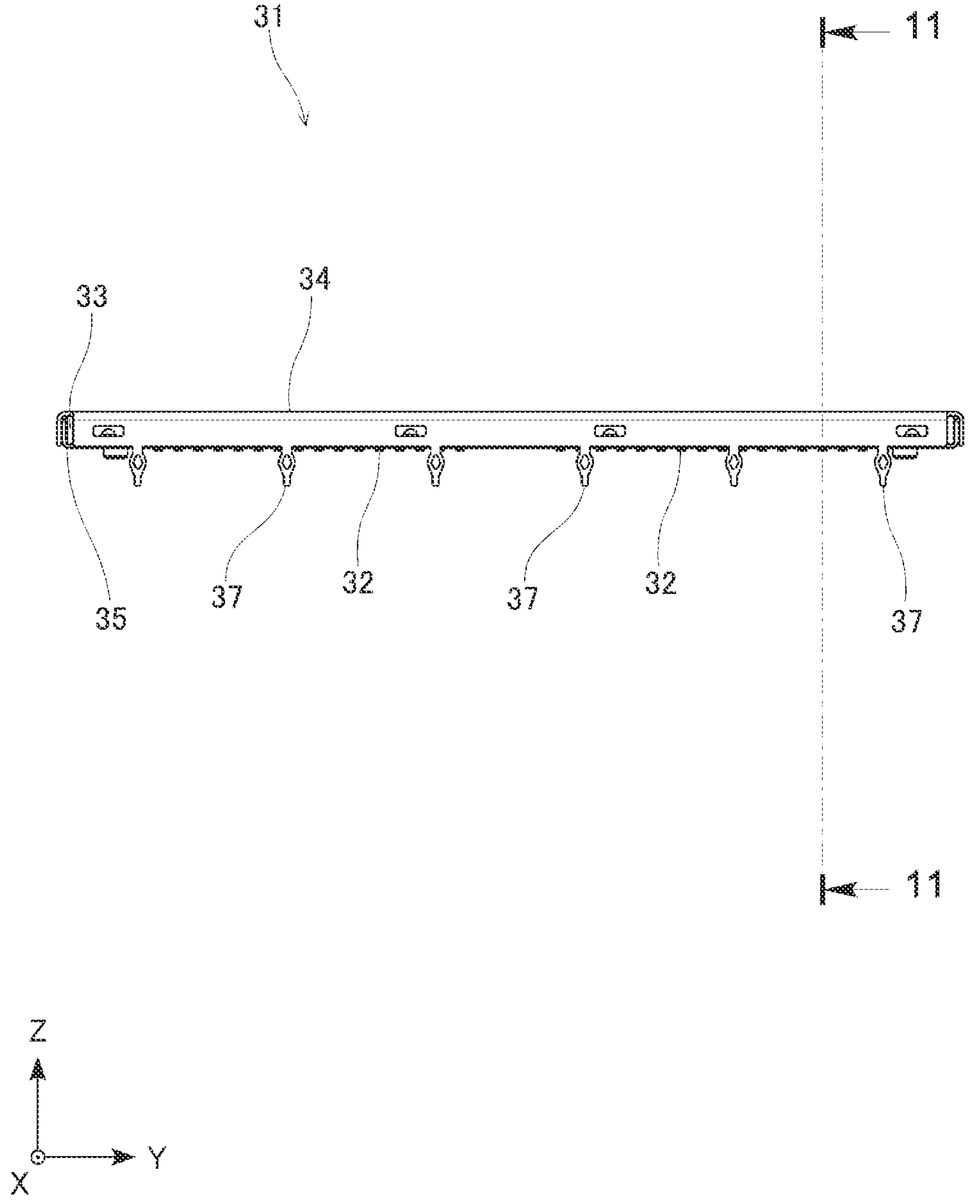
FIG. 9 is a front view of the compression connector according to the first embodiment.
Figure 10:
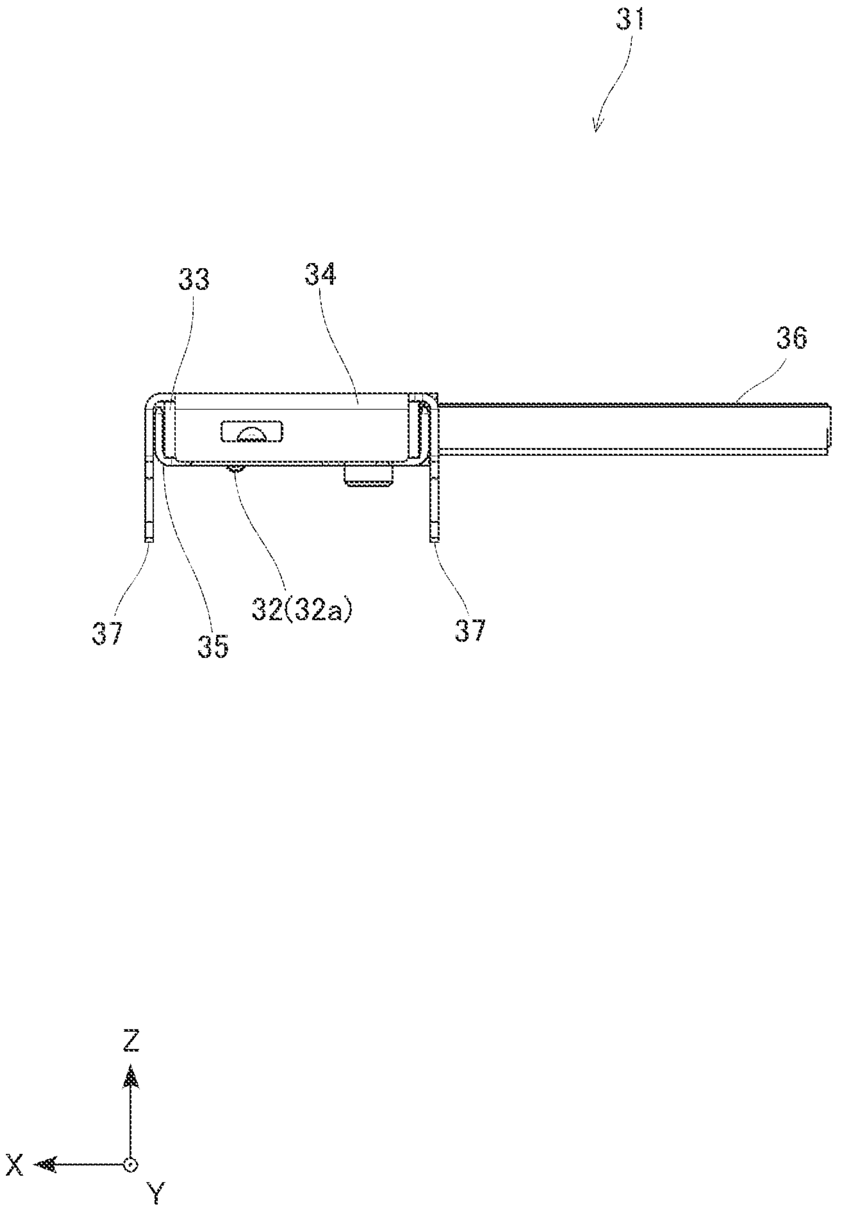
FIG. 10 is a right side view of the compression connector according to the first embodiment.

As shown in, in particular, FIGS. 8 and 9, a plurality of contacts 32 are disposed to be laterally arranged in the left-right direction.

Figure 11:
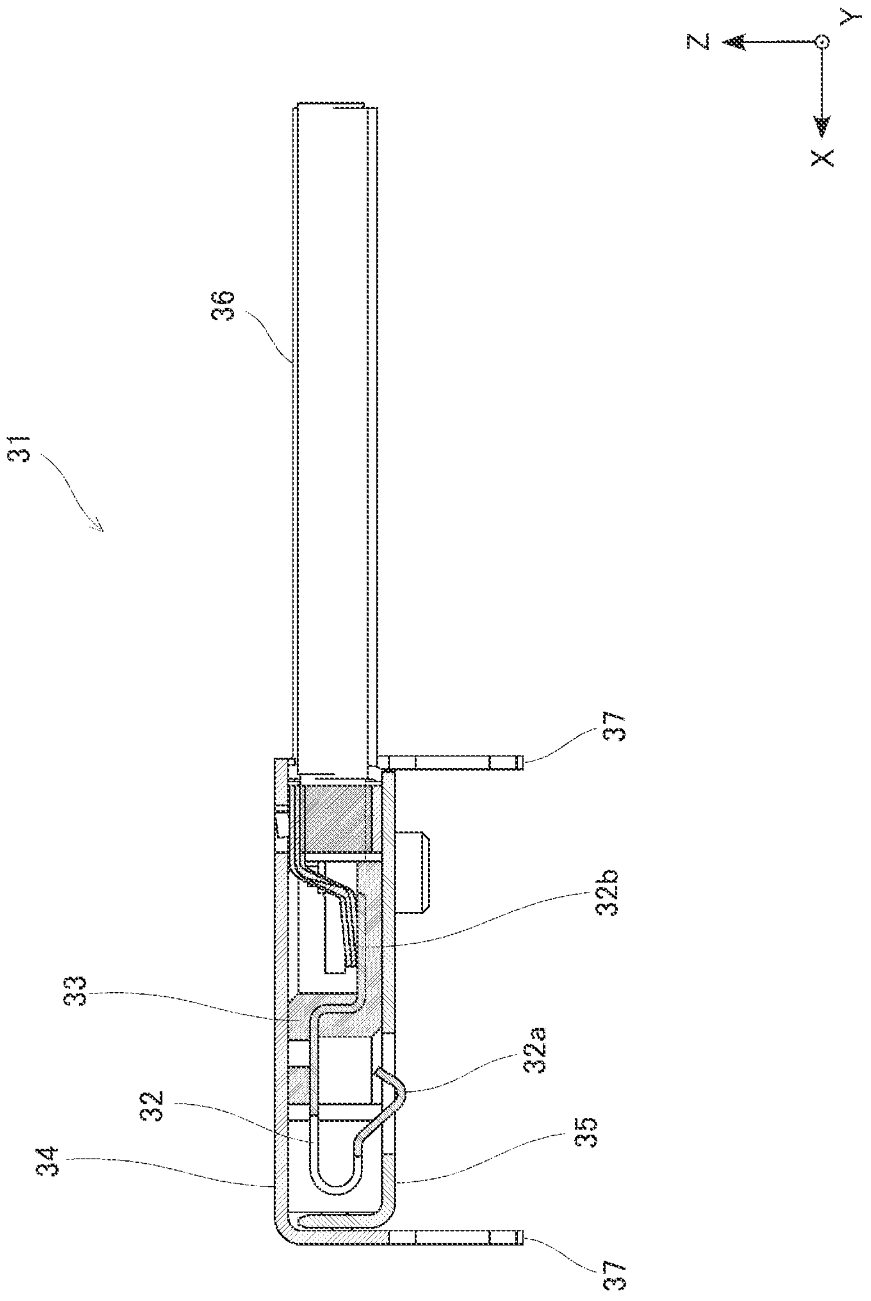
FIG. 11 is a longitudinal sectional view taken along line 11-11 in FIG. 9.

Each of the plurality of contacts 32 is fixed to the housing 33 as shown in FIG. 11. A front end portion 32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 11). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the position of the bottom surface of the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32 can maintain a stable and secure connection state.

On the other hand, a rear end portion 32*b* of the contact 32 has a linear shape extending straight. As shown in FIG. 11, an electric cable 36 is connected to the rear end portion 32*b* of the contact 32 by solder or the like. Therefore, an electric signal, power supply power, and the like from the outside are transmitted to the substrate 11 side via the electric cable 36 and the contact 32.

Note that, concerning the members configuring the compression connector 31 in the first embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

Figure 12:
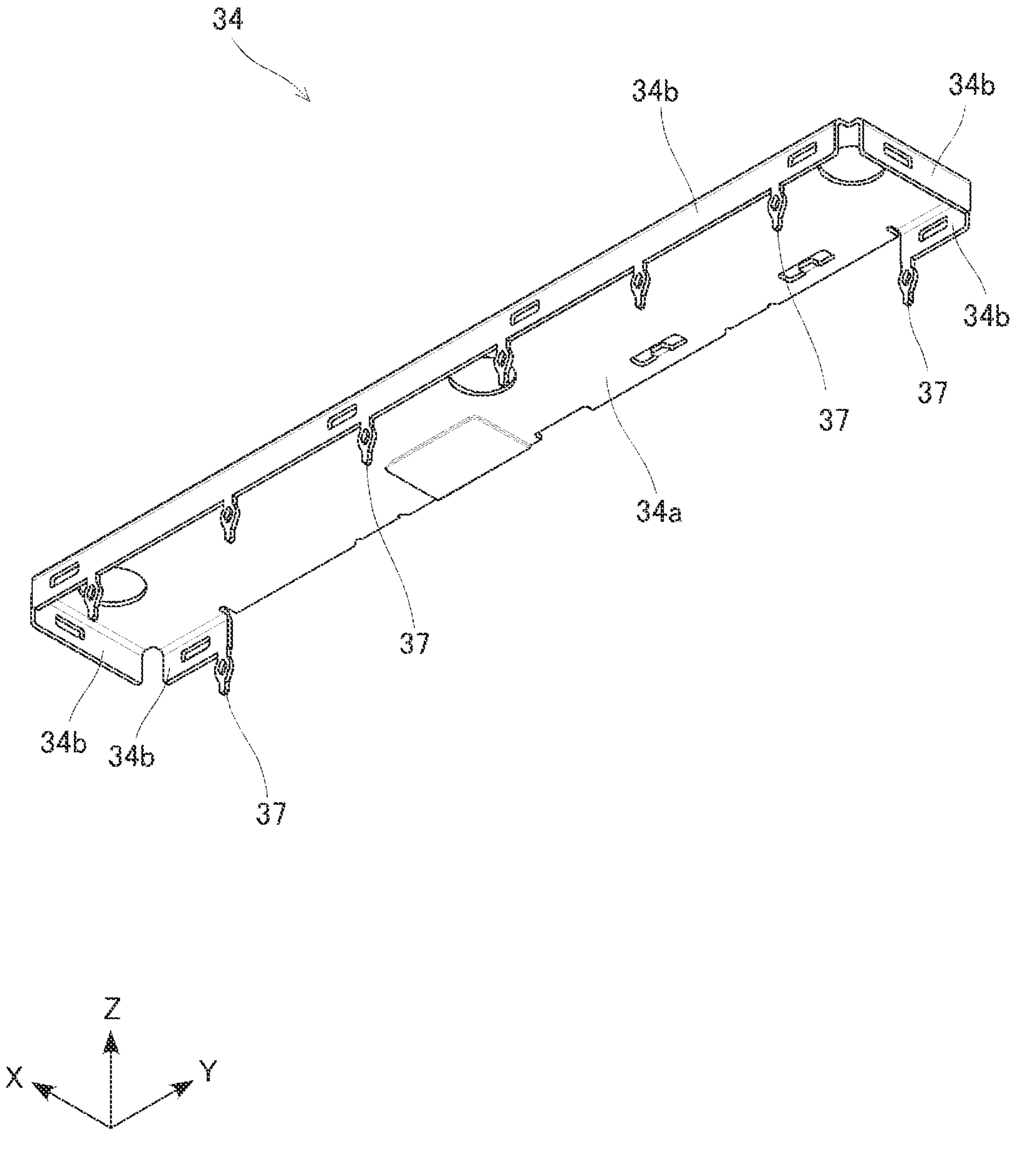
FIG. 12 is an exterior perspective view of a cover shell included in the compression connector according to the first embodiment viewed from the front lower right.

The cover shell 34 configuring the compression connector 31 in the first embodiment includes, as shown in FIG. 12, a top surface 34*a* disposed in parallel to the substrate 11 and a vertical surface 34*b* vertically bent in the substrate 11 direction from the top surface 34*a* of the cover shell 34. Eight press-fit pins 37 as fixing parts piercing through the holes 12 formed in the substrate 11 and functioning as slip-off prevention for the compression connector 31 with respect to the substrate 11 are installed on the substrate 11 side of the vertical surface 34*b*, that is, the lower side of the vertical surface 34*b*.

In the cover shell 34 in the first embodiment, among the eight press-fit pins 37, six press-fit pins 37 are disposed at substantially equal intervals in positions on the front side of the cover shell 34, one press-fit pin 37 is disposed in a position closer to the rear side right end of the cover shell 34, and one press-fit pin 37 is disposed in a position closer to the rear side left end of the cover shell 34.

Figure 13:
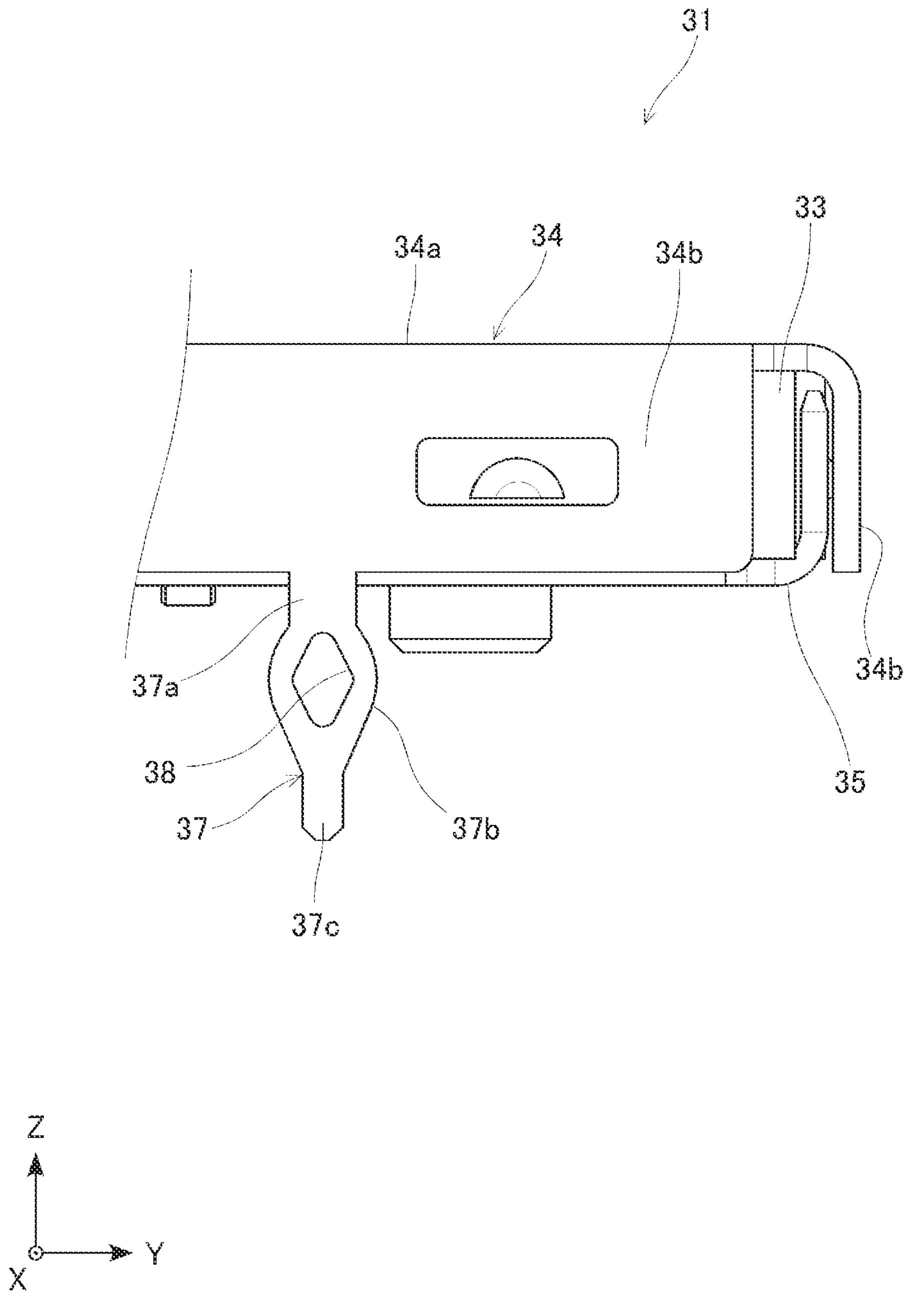
FIG. 13 is a main part enlarged front view enlarging a main part of the cover shell included in the compression connector according to the first embodiment.

Concerning a specific shape of the press-fit pin 37 in the first embodiment, as shown in FIG. 13, the press-fit pin 37 is formed to include a flat base section 37*a* formed to be connected to the substrate 11 side of the vertical surface 34*b*, an opening section 37*b* connected to the substrate 11 side of the base section 37*a* and including an opening hole 38, and a flat distal end portion 37*c* formed to be connected to the substrate 11 side of the opening section 37*b*. In the press-fit pin 37 in the first embodiment, the opening section 37*b* is formed to have a width dimension larger than the base section 37*a* and the distal end portion 37*c* and, further, the width dimension of the opening section 37*b* is formed in a dimension larger than the inner diameter of the hole 12 formed in the substrate 11. Therefore, when the press-fit pin 37 is inserted into the hole 12 formed in the substrate 11, the wide opening section 37*b* is located on the inside of the hole 12 of the substrate 11 and the opening section 37*b* is compressed in the hole 12 of the substrate 11. At this time, force for returning to an original shape acts on the opening section 37*b* based on the elasticity of a metal material with the wide dimension of the opening section 37*b* and the action of the opening hole 38. Therefore, a fictional force acts between the opening section 37*b* of the press-fit pin 37 and the hole 12 of the substrate 11. A sum of the frictional force is force larger than a sum of force by spring elasticity applied to the upper surface of the substrate 11 by each of the plurality of contacts 32. Therefore, the compression connector 31 is held by the frictional force not to slip off in the vertical direction with respect to the substrate 11.

As explained above, in the connector with substrate 10 according to the first embodiment, the compression connector 31 can be easily connected to the substrate 11 simply by inserting the press-fit pin 37 into the hole 12 formed in the substrate 11. That is, with the connector with substrate 10 according to the first embodiment, a configuration is realized in which, when the compression connector 31 and the substrate 11 are fixed, connector attaching (fixing) work is easy and the compression connector 31 can be fixed to the substrate 11 with a small motion. Therefore, with the connector with substrate 10 according to the first embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the first embodiment. Various changes or improvements can be added to the first embodiment.

For example, in the first embodiment explained above, a case in which the eight press-fit pins 37 are used is illustrated. However, the number and disposition positions of the press-fit pins 37 functioning as the fixing parts of the present invention can be optionally changed. For example, the number of the press-fit pins 37 only has to be one or more. The disposition positions of the press-fit pins 37 can be arranged in any positions considering the shapes and the like of the compression connector 31 and the substrate 11.

For example, in the first embodiment explained above, when the press-fit pin 37 is inserted into the hole 12 formed in the substrate 11, the wide opening section 37*b* is located on the inside of the hole 12 of the substrate 11 and the opening section 37*b* is compressed in the hole 12 of the substrate 11. However, in the present invention, the press-fit pin 37 may be used to function as the slip-stop pin. That is, when the press-fit pin 37 is inserted into the hole 12 formed in the substrate 11, the wide opening section 37*b* may be caught in an inlet on the lower side of the hole 12 to apply slip-off prevention action by allowing the wide opening section 37*b* to pass the hole 12 of the substrate 11 to pass through the inside of the hole 12 to be located below.

The configuration of the connector with substrate 10 according to the first embodiment is explained above with reference to FIGS. 1 to 13. Subsequently, a connector with substrate 100 according to a second embodiment, which is another form example that the connector with substrate according to the present invention can take, is explained with reference to FIGS. 14 to 25. Note that, in the following explanation, members that are the same as or similar to the members explained in the first embodiment above are denoted by the same reference numerals and signs and explanation of the members is sometimes omitted.

Second Embodiment

Figure 14:
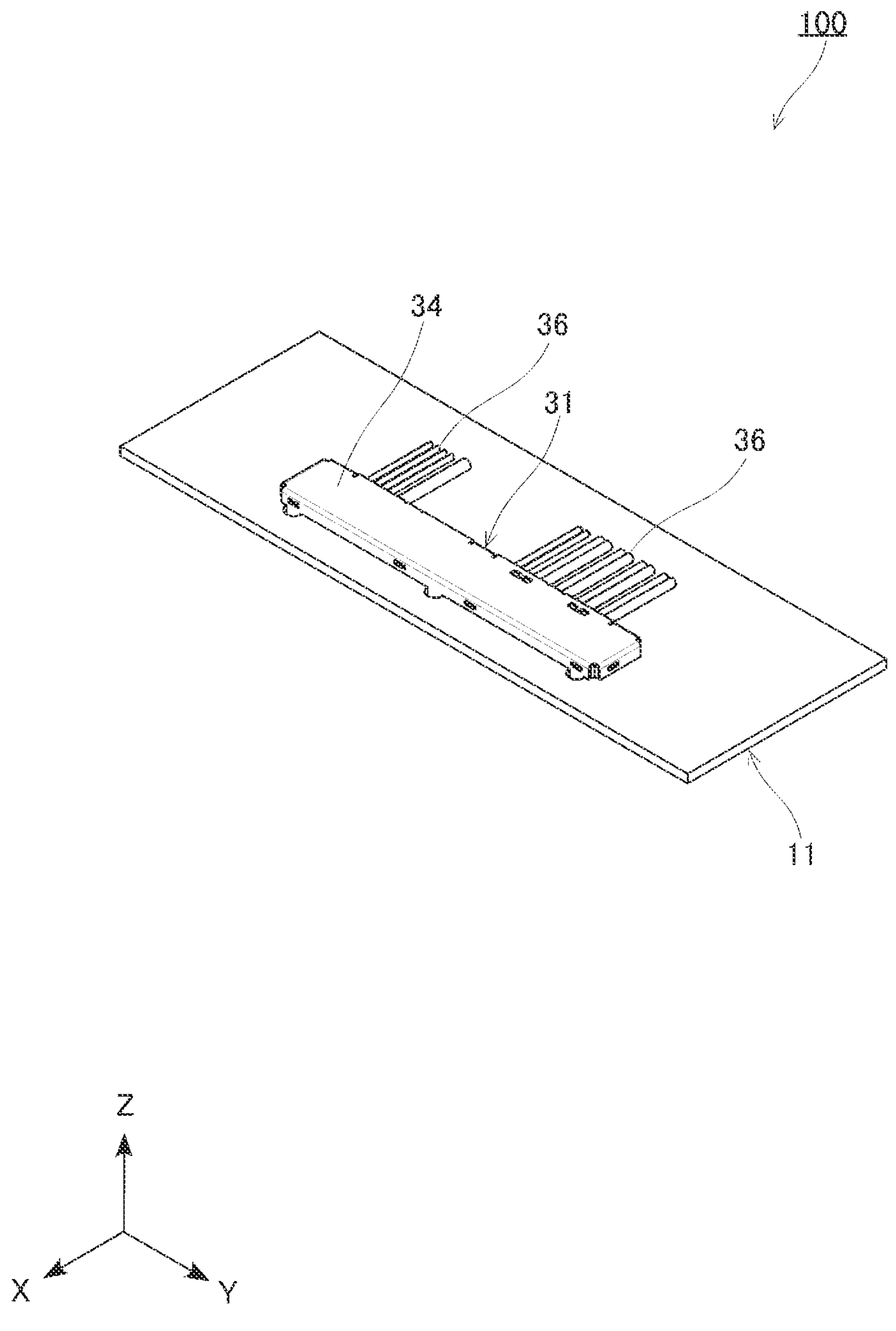
FIG. 14 is an exterior perspective view of a connector with substrate according to a second embodiment viewed from the front upper right.
Figure 15:
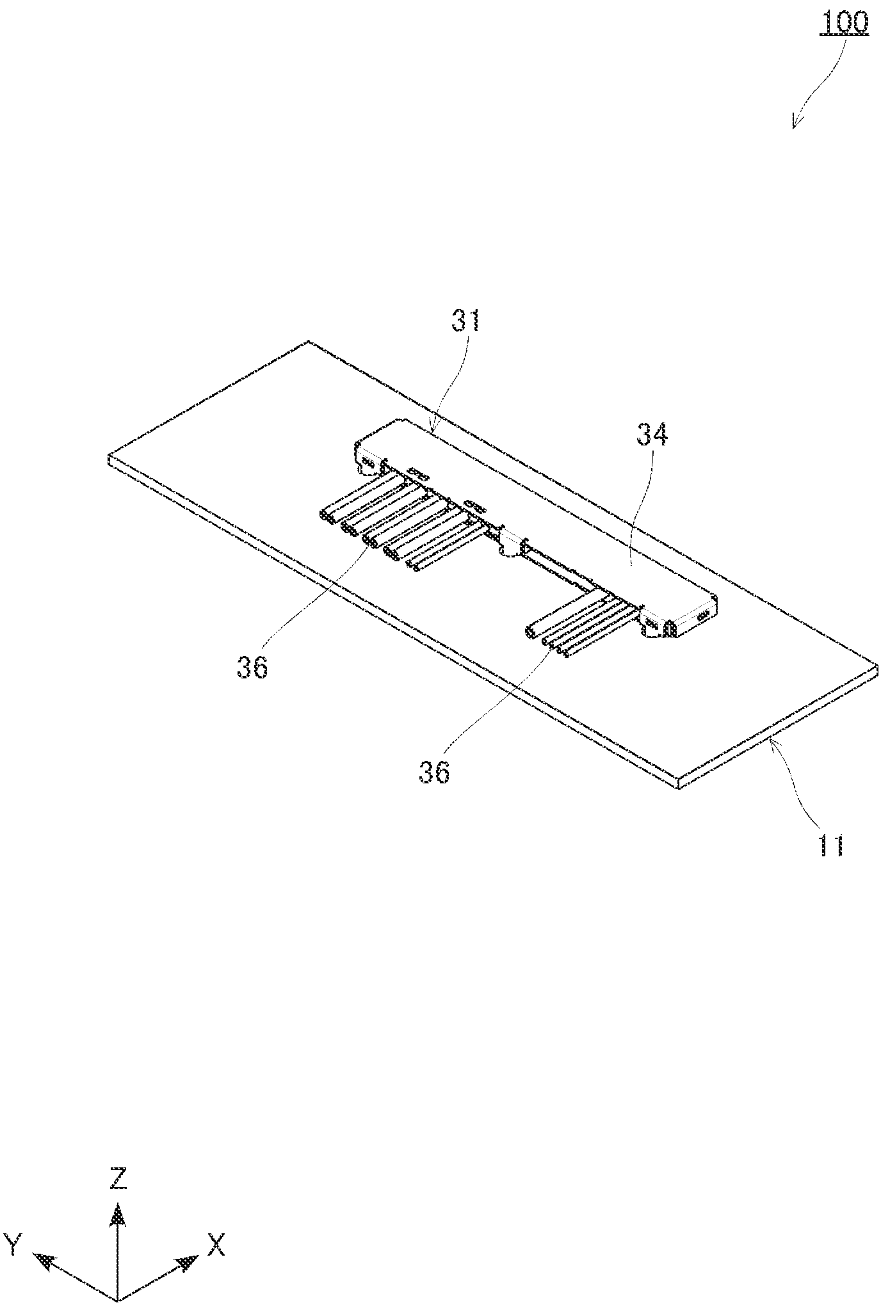
FIG. 15 is an exterior perspective view of the connector with substrate according to the second embodiment viewed from the rear upper left.
Figure 16:
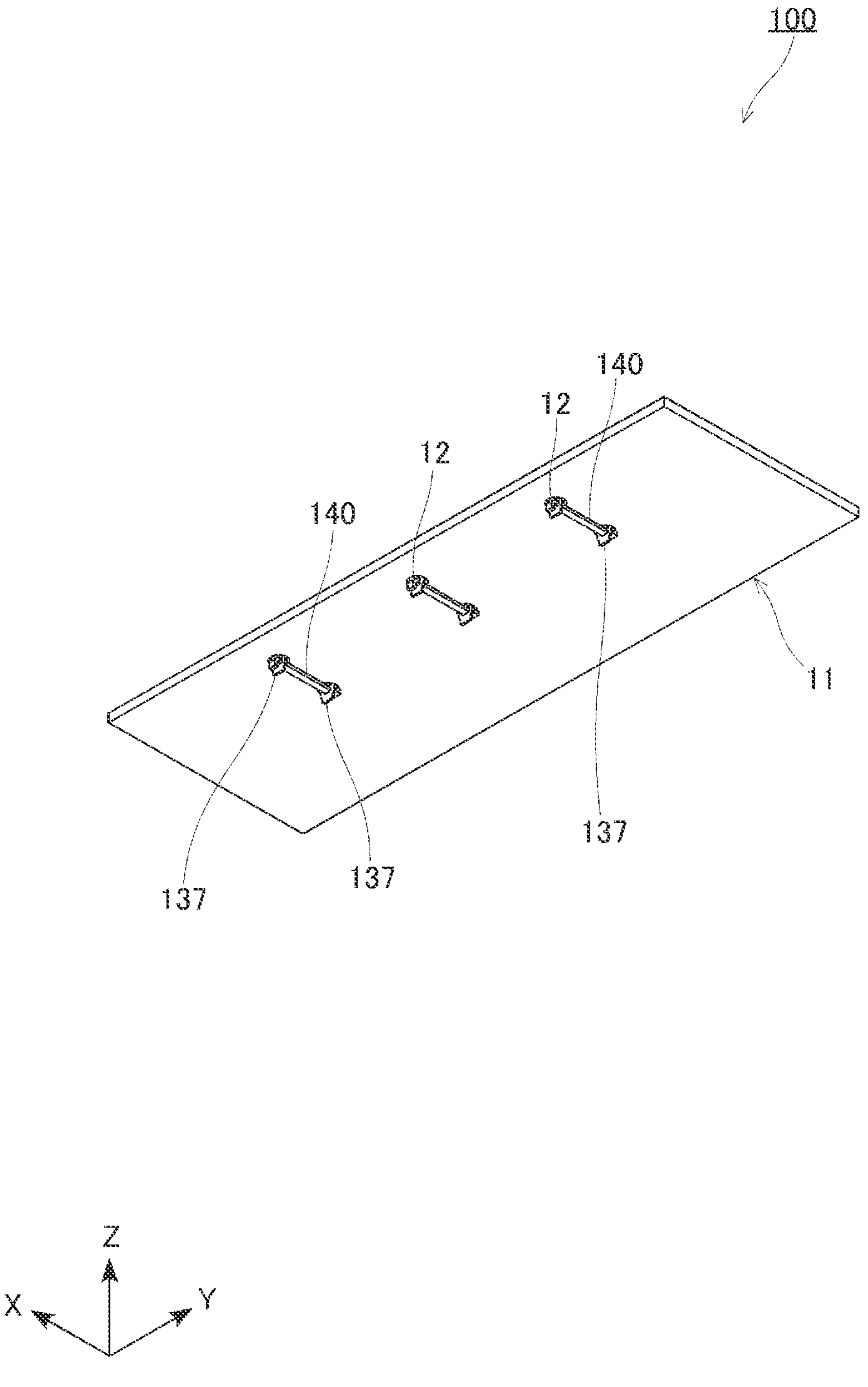
FIG. 16 is an exterior perspective view of the connector with substrate according to the second embodiment viewed from the front lower right.

A configuration of the connector with substrate 100 according to the second embodiment is explained with reference to FIGS. 14 to 25. The connector with substrate 100 according to the second embodiment includes, as shown in FIGS. 14 to 16, the substrate 11, and the compression connector 31 attached to the upper surface of the substrate 11.

The substrate 11 includes a not-shown printed circuit and the like. The substrate 11 is electrically connected to the compression connector 31 attached to the upper surface of the substrate 11 to be configured to be able to deliver an electric signal, power supply power, and the like.

Figure 17:
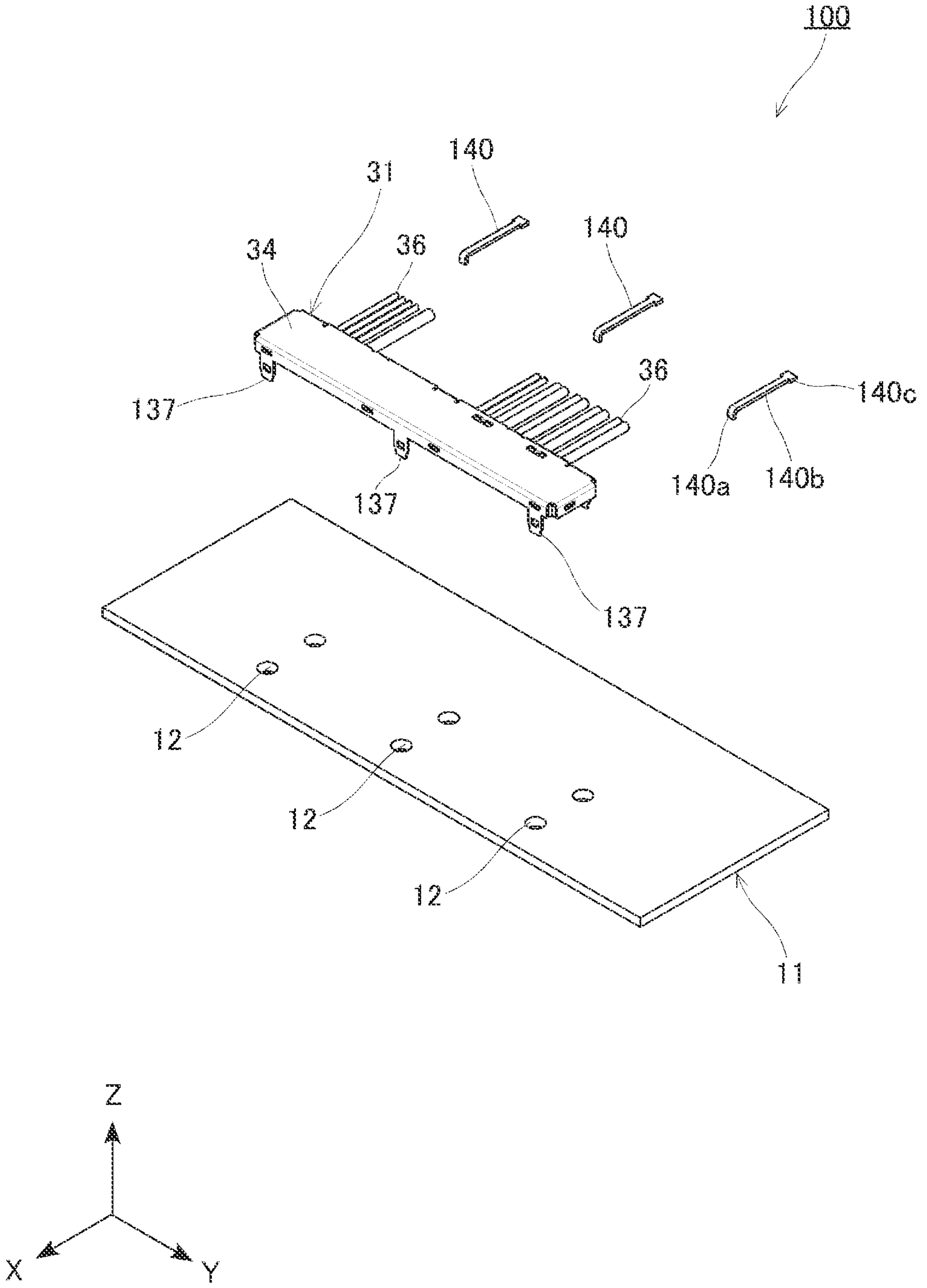
FIG. 17 is an exterior perspective view of a state in which a compression connector and a slip-stop pin are detached from a substrate in the connector with substrate according to the second embodiment, the state being viewed from the front upper right.
Figure 18:
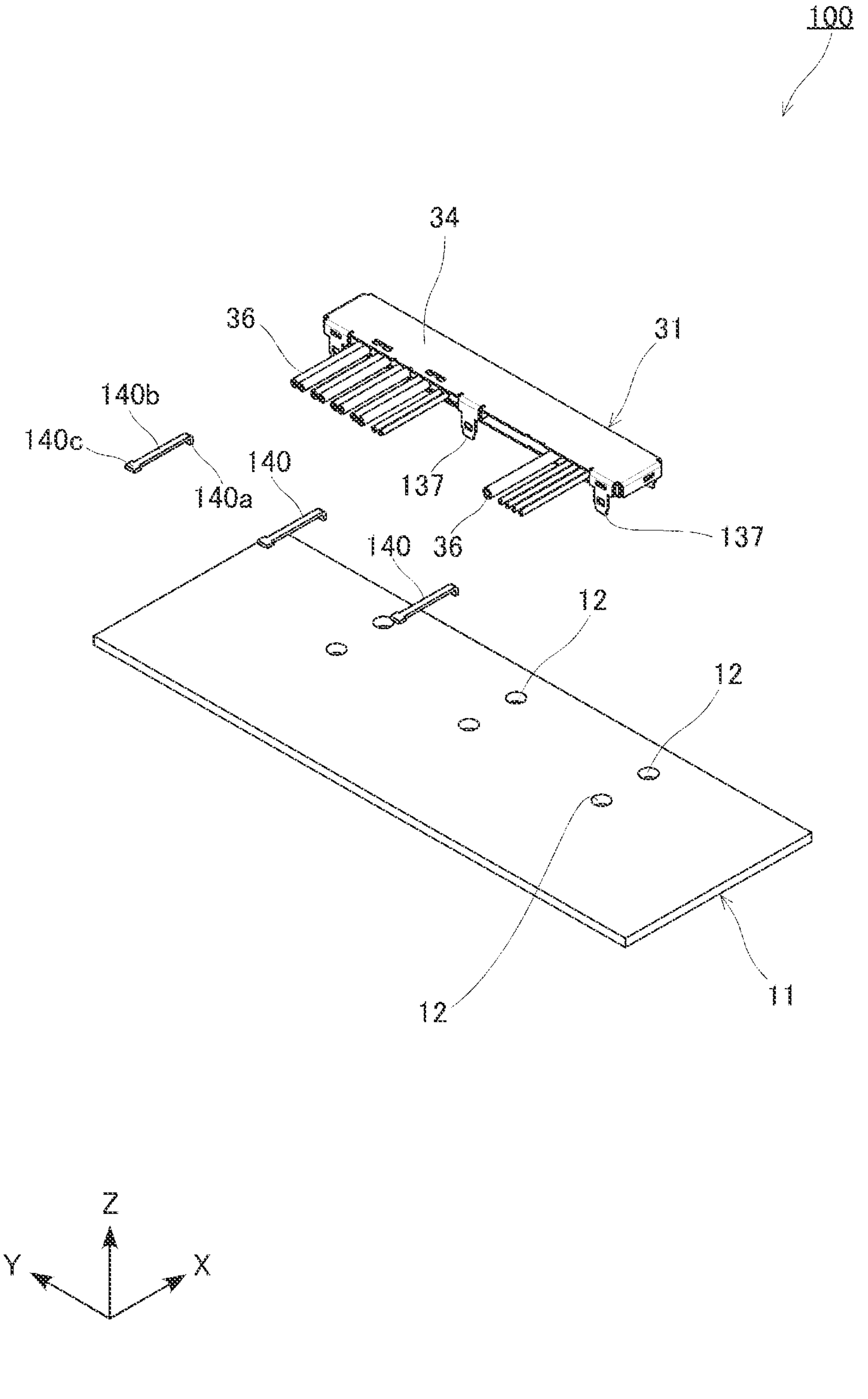
FIG. 18 is an exterior perspective view of the state in which the compression connector and the slip-stop pin are detached from the substrate in the connector with substrate according to the second embodiment, the state being viewed from the rear upper left.
Figure 19:
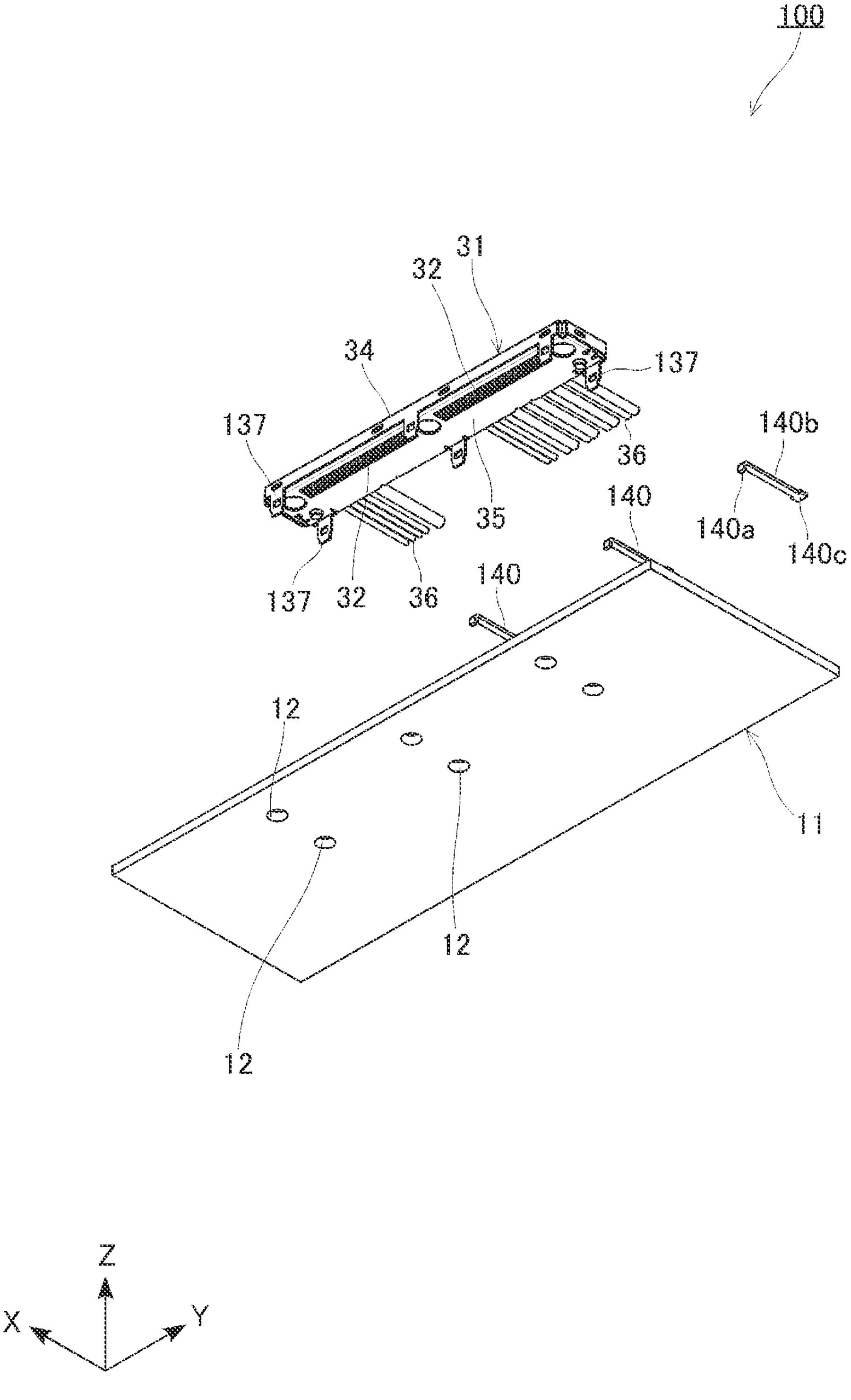
FIG. 19 is an exterior perspective view of the state in which the compression connector and the slip-stop pin are detached from the substrate in the connector with substrate according to the second embodiment, the state being viewed from the front lower right.
Figure 20:
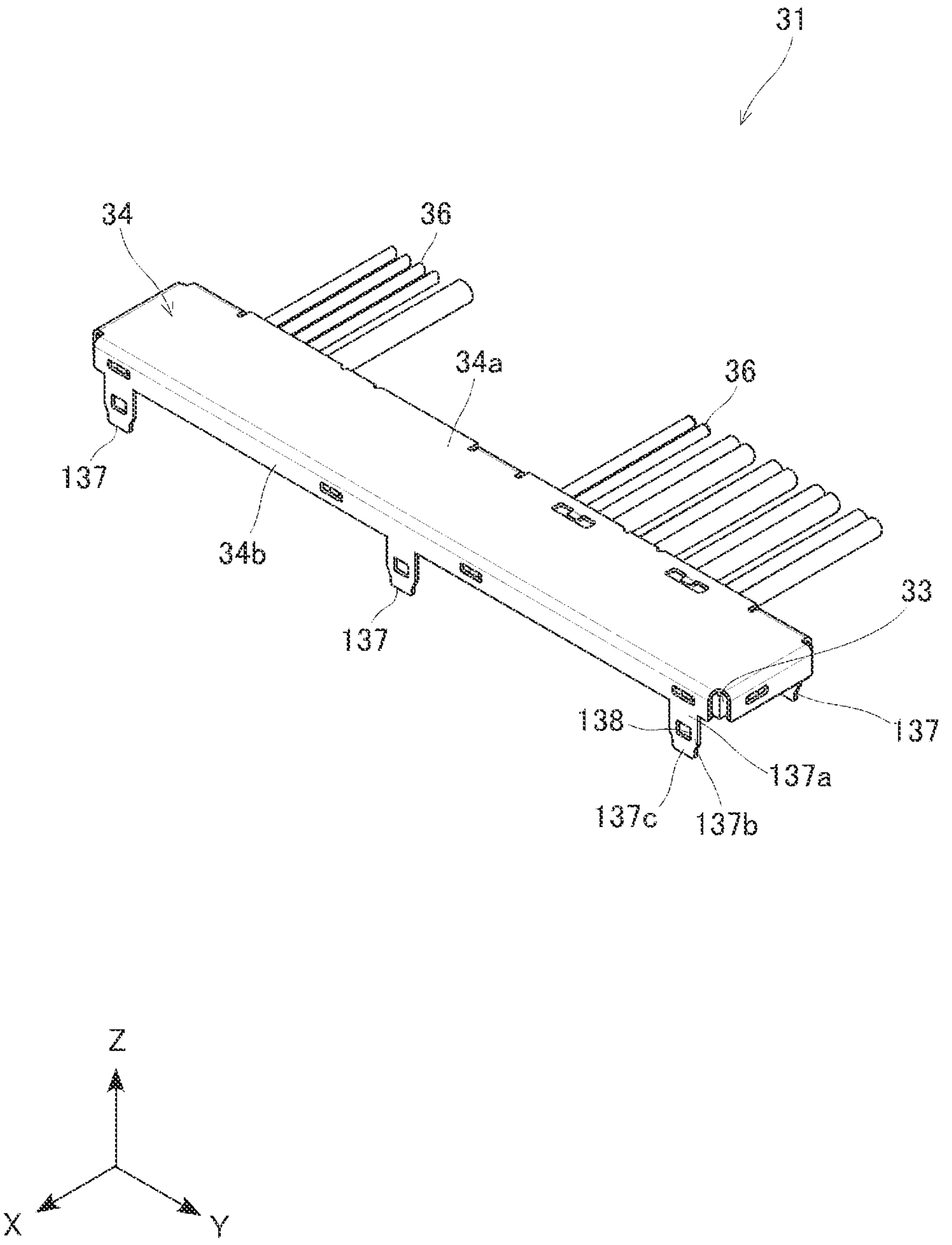
FIG. 20 is an exterior perspective view of a compression connector according to the second embodiment viewed from the front upper right.

The plurality of holes 12 are formed in the substrate 11 as shown in, in particular, FIGS. 17 to 19. A plurality of fixing leg sections 137 included in the compression connector 31 explained below are inserted into the plurality of (in the second embodiment, six) holes 12 to fix the compression connector 31 to the substrate 11. Note that the plurality of fixing leg sections 137 are parts formed as the fixing parts according to the present invention.

The compression connector 31 includes, as shown in FIGS. 20 to 25, the contact 32 that is in contact with the substrate 11, the housing 33 to which the contact 32 is fixed, the cover shell 34 that covers the upper surface portion of the housing 33, and the bottom shell 35 that covers the lower surface portion of the housing 33.

Figure 21:
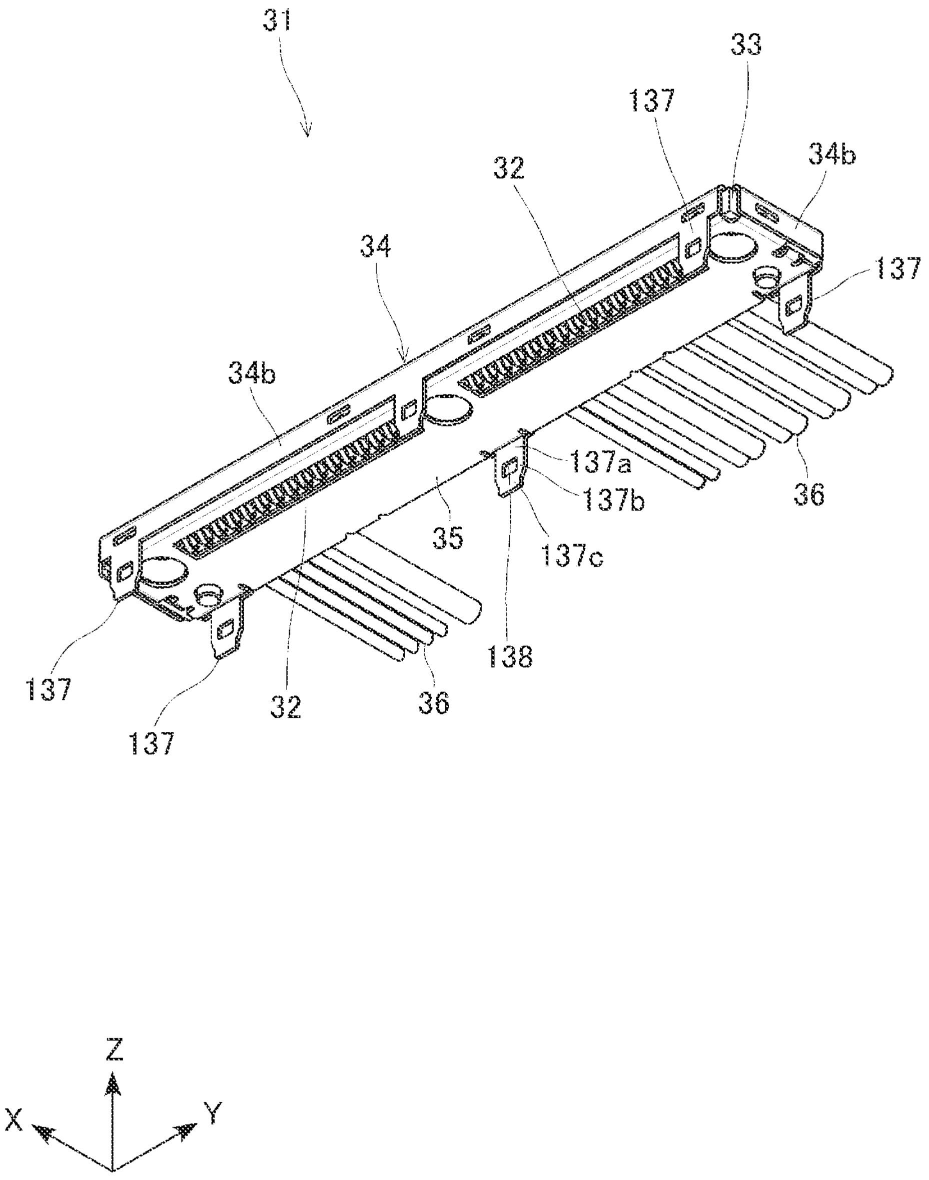
FIG. 21 is an exterior perspective view of the compression connector according to the second embodiment viewed from the front lower right.
Figure 22:
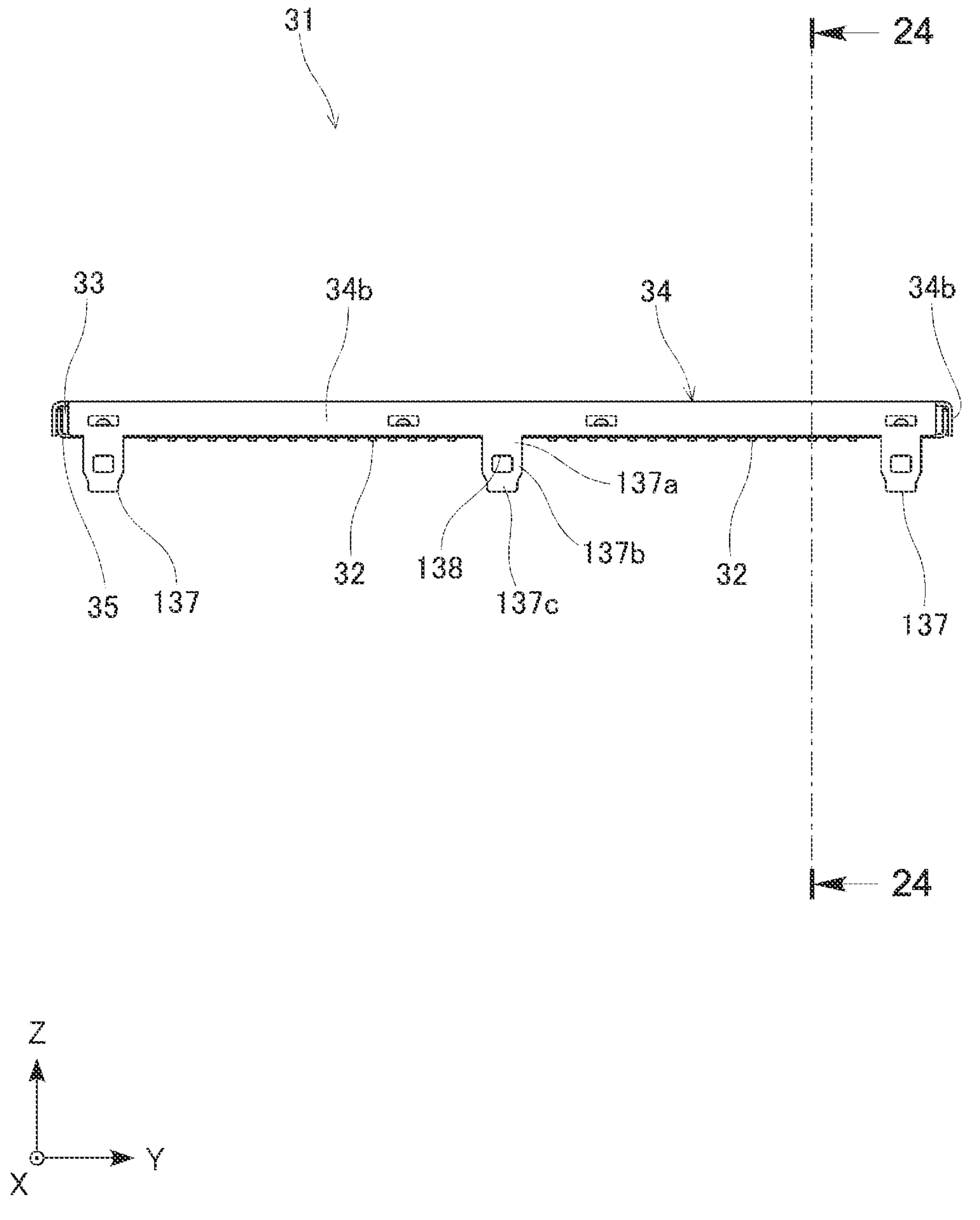
FIG. 22 is a front view of the compression connector according to the second embodiment.
Figure 23:
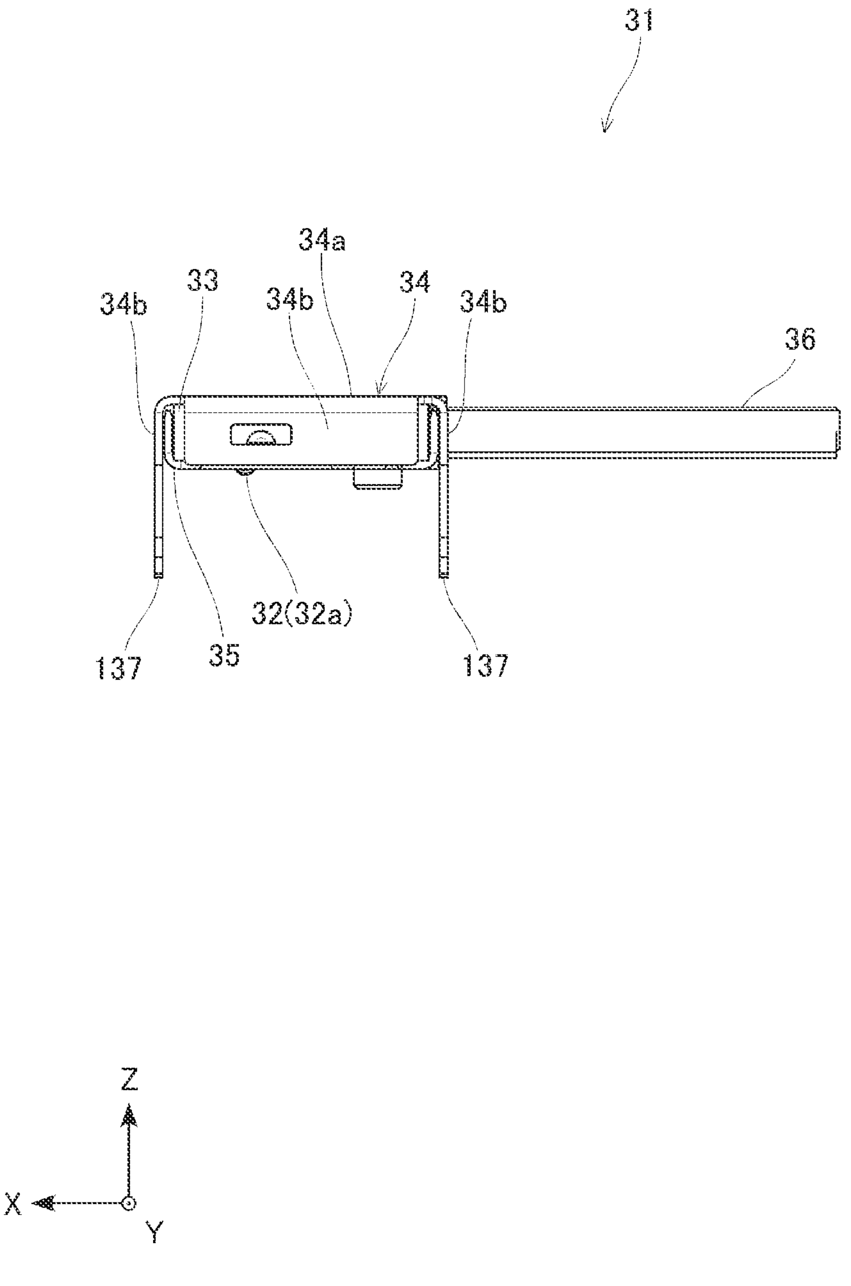
FIG. 23 is a right side view of the compression connector according to the second embodiment.

As shown in, in particular, FIGS. 21 and 22, the plurality of contacts 32 are disposed to be laterally arranged in the left-right direction.

Figure 24:
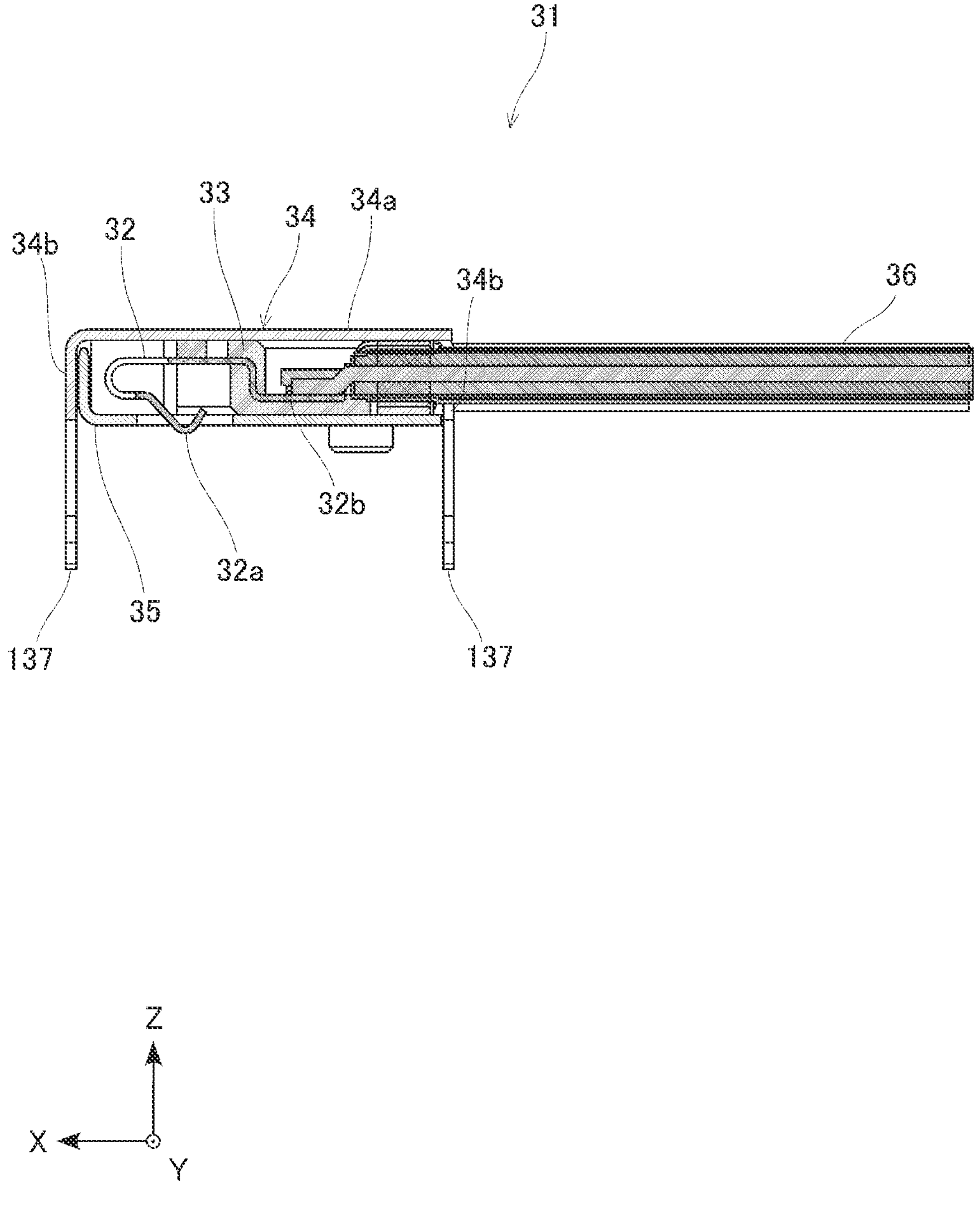
FIG. 24 is a longitudinal sectional view taken along line 24-24 in FIG. 22.

Each of the plurality of contacts 32 is fixed to the housing 33 as shown in FIG. 24. The front end portion 32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 24). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the position of the bottom surface of the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32 can maintain a stable and secure connection state.

On the other hand, the rear end portion 32*b* of the contact 32 has a linear shape extending straight. As shown in FIG. 24, the electric cable 36 is connected to the rear end portion 32*b* of the contact 32 by solder or the like. Therefore, an electric signal, power supply power, and the like from the outside are transmitted to the substrate 11 side via the electric cable 36 and the contact 32.

Note that, concerning the members configuring the compression connector 31 in the second embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

The cover shell 34 configuring the compression connector 31 in the second embodiment includes, as shown in FIGS. 20 to 25, the top surface 34*a* disposed in parallel to the substrate 11 and the vertical surface 34*b* vertically bent in the substrate 11 direction from the top surface 34*a* of the cover shell 34. Six fixing leg sections 137 as fixing parts piercing through the holes 12 formed in the substrate 11 and functioning as slip-off prevention for the compression connector 31 with respect to the substrate 11 are installed on the substrate 11 side of the vertical surface 34*b*, that is, the lower side of the vertical surface 34*b*.

In the cover shell 34 in the second embodiment, among the six fixing leg sections 137, three fixing leg sections 137 are disposed at substantially equal intervals in positions on the front side of the cover shell 34 and three fixing leg sections 137 are disposed at substantially equal intervals in positions on the rear side of the cover shell 34. In the second embodiment, the fixing leg sections 137 disposed on the front side and the fixing leg sections 137 disposed on the rear side are respectively disposed to overlap in a front view. Two fixing leg sections 137 in the front and the rear are paired to form three sets of pairs of the fixing leg sections 137 in total.

Concerning a specific shape of the fixing leg section 137 in the second embodiment, as shown in FIGS. 20 to 25, the fixing leg section 137 is formed to include a flat base section 137*a* formed to be connected to the substrate 11 side of the vertical surface 34*b*, an opening section 137*b* connected to the substrate 11 side of the base section 137*a* and including an opening hole 138, and a flat distal end portion 137*c* formed to be connected to the substrate 11 side of the opening section 137*b*. In the connector with substrate 100 in the second embodiment, a slip-stop pin 140 that can be inserted into the opening hole 138 of the opening section 137*b* formed in the fixing leg section 137 is prepared.

The slip-stop pin 140 in the second embodiment includes, as shown in FIGS. 17 to 19, a pin distal end portion 140*a* that is bent when being inserted into the opening hole 138, an insertion section 140*b* that is inserted into the opening hole 138 to function as slip-off prevention for the compression connector 31 with respect to the substrate 11, and a flange section 140*c* having a width dimension larger than the hole diameter of the opening hole 138. Note that, in FIGS. 16 to 19 and 25, a state in which the pin distal end portion 140*a* is already bent is drawn. However, the pin distal end portion 140*a* of the slip-stop pin 140 at a stage before installation has a shape extending straight in the front-rear direction like the insertion section 140*b*.

Figure 25:
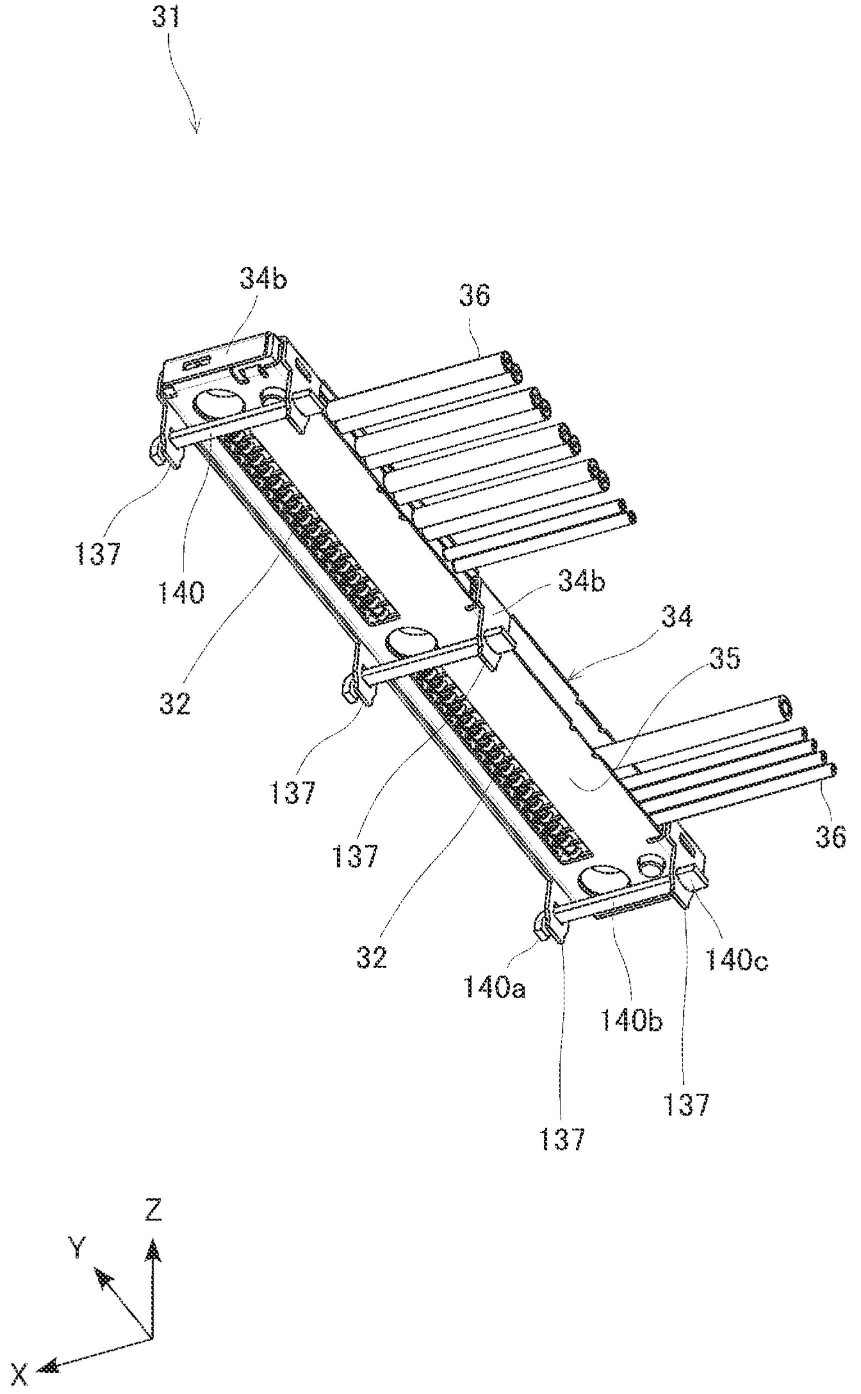
FIG. 25 is an exterior perspective view of a state in which only the substrate is removed from the connector with substrate according to the second embodiment for convenience of explanation, the state being viewed from the rear lower right.
Figure 26:
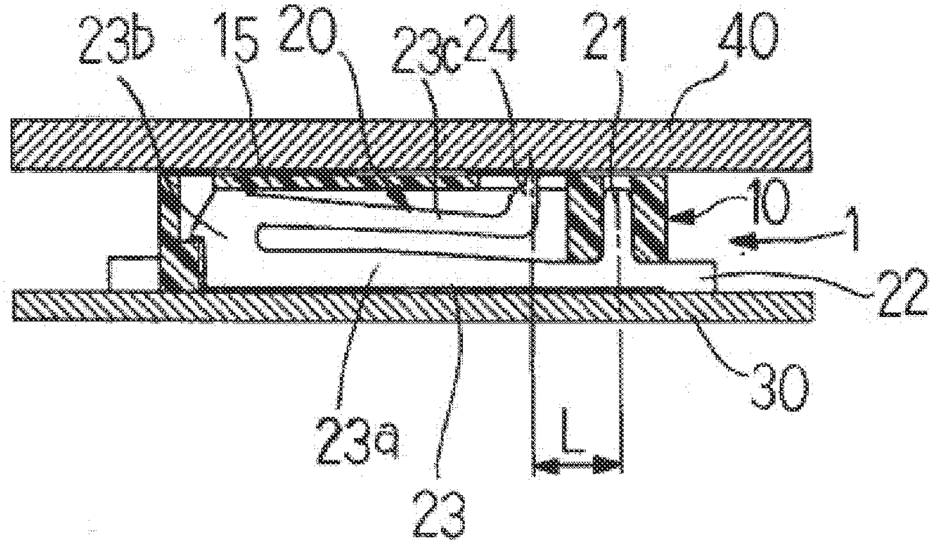
FIG. 26 is a sectional view showing a state in which a connector of a compression type of the related art is disposed between circuit boards.

Subsequently, an installation method for the connector with substrate 100 according to the second embodiment is explained. First, the fixing leg sections 137 included in the compression connector 31 are inserted into the holes 12 of the substrate 11 from a state shown in FIGS. 17 to 19. From this state, three slip-stop pins 140 are inserted into the opening holes 138 formed in the opening sections 137*b* included in the fixing leg sections 137. Note that, as explained above, as the six fixing leg sections 137 included in the compression connector 31 in the second embodiment, the fixing leg sections 137 disposed on the front side and the fixing leg sections 137 disposed on the rear side respectively form the three sets of the pairs of the fixing leg sections 137 in total to overlap in the front view. Therefore, concerning the opening holes 138 formed in the opening sections 137*b* included in the six fixing leg sections 137, three sets of pairs of two opening holes 138 are present. The three slip-stop pins 140 are respectively inserted into the three sets of the paired opening holes 138. At this time, the slip-stop pin 140 is inserted into the opening hole 138 with the distal end portion 137*c* directed from the rear side to the front side. When the slip-stop pin 140 is inserted until the flange section 140*c* of the slip-stop pin 140 comes into contact with the opening hole 138 of the fixing leg section 137 disposed on the rear side, as shown in FIG. 25, the insertion section 140*b* of the slip-stop pin 140 is laid between one set of the opening holes 138 disposed to overlap in the front view. Further, the pin distal end portion 140*a* of the slip-stop pin 140 pierces forward through the opening hole 138 of the opening section 137*b* formed in the fixing leg section 137 on the front side. The pin distal end portion 140*a* of the slip-stop pin 140 is bent downward in this state to complete an installation state shown in FIG. 25.

When the installation state shown in FIG. 25 is completed, forces in directions separating from each other act between the substrate 11 and the compression connector 31 with force by spring elasticity applied to the upper surface of the substrate 11 by each of the plurality of contacts 32. However, since the slip-stop pins 140 are installed in the fixing leg sections 137 included in the compression connector 31 to sandwich the substrate 11, the slip-stop pin 140 receives the force by the spring elasticity to hold the compression connector 31 not to slip off in the vertical direction with respect to the substrate 11.

As explained above, in the connector with substrate 100 according to the second embodiment, the compression connector 31 can be easily connected to the substrate 11 simply by inserting the fixing leg section 137 into the hole 12 formed in the substrate 11 and further inserting the slip-stop pin 140 into and fixing the slip-stop pin 140 in the opening hole 138 formed in the fixing leg section 137. The slip-stop pin 140 in the second embodiment is prevented from slipping off by bending the pin distal end portion 140*a* after being inserted into the opening hole 138 included in the opening section 137*b* of the fixing leg section 137. Therefore, the slip-stop pin 140 is not dropped or lost unlike the screws and the nuts of the related art. Further, since the connector with substrate 100 contains a mechanism for fixing the compression connector 31 with a pin shape of the slip-stop pin 140, unlike with the related art, work manhours involving attachment are reduced and torque management for the screws is unnecessary.

That is, with the connector with substrate 100 according to the second embodiment, a configuration is realized in which, when the compression connector 31 and the substrate 11 are fixed, connector attaching (fixing) work is easy and the compression connector 31 can be fixed to the substrate 11 with a small motion. Therefore, with the connector with substrate 100 according to the second embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the second embodiment. Various changes or improvements can be added to the second embodiment.

For example, in the second embodiment explained above, a configuration is adopted in which, concerning the opening holes 138 formed in the opening sections 137*b* included in the six fixing leg sections 137, the three sets of the pairs of the two opening holes 138 are prepared and the three slip-stop pins 140 are respectively inserted through the present three sets of the pairs of the opening holes 138. However, a method of respectively combining the numbers and the disposition positions of the fixing leg sections 137 and the slip-stop pins 140 functioning as the fixing parts of the present invention can be optionally changed.

It is evident from the description of the claims that such changed or improved forms can also be included in the technical scope of the present invention.

REFERENCE SIGNS LIST

10 Connector with substrate (in first embodiment)
100 Connector with substrate (in second embodiment)
11 Substrate
12 Hole
31 Compression connector
32 Contact

32*a* Front end portion
32*b* Rear end portion
33 Housing
34 Cover shell
34*a* Top surface
34*b* Vertical surface
35 Bottom shell
36 Electric cable
37 Press-fit pin (Fixing part)
37*a* Base section
37*b* Opening section
37*c* Distal end portion
38 Opening hole
137 Fixing leg section (Fixing part)
137*a* Base section
137*b* Opening section
137*c* Distal end portion
138 Opening hole
140 Slip-stop pin
140*a* Pin distal end portion
140*b* Insertion section
140*c* Flange section

What is claimed is:

1. A connector with substrate in which a compression connector pressed against and connected to a connection target object and a substrate are attached, the connector with substrate comprising:

a substrate including a hole;

a compression connector disposed on the substrate and including contacts that are in contact with the substrate, a housing to which the contacts are fixed, and a cover shell that has a top surface disposed in parallel to the substrate and a vertical surface vertically extending to the substrate from the top surface, and that covers an upper surface portion of the housing; and a slip-stop pin installed in the compression connector, wherein the vertical surface includes at least one fixing part at a substrate side, piercing through the hole formed in the substrate and functioning as slip-off prevention for the compression connector with respect to the substrate, the at least one fixing part includes:

a flat base section, an opening section connected to the base section and including an opening hole, and a flat distal end portion connected to the opening section, and the slip-stop pin is inserted into the opening hole included in the opening section, and includes:

a pin distal end portion inserted through the opening hole and bent;

an insertion section functioning as slip-off prevention for the compression connector with respect to the substrate by being inserted into the opening hole; and a flange section having a width dimension larger than that of the opening hole.

2. The connector with substrate according to claim 1, wherein the compression connector includes a bottom shell that covers a lower surface portion of the housing.

3. The connector with substrate according to claim 1, wherein the at least one fixing part includes a pair of fixing parts arranged at a frond side and a rear side of the compression connector and facing each other, and the pin distal end portion is arranged at the front side of the compression connector and the flange section is arranged at the rear side of the compression connector.

* * * * *